US011570598B2

(12) United States Patent
Boudreau et al.

(10) Patent No.: US 11,570,598 B2
(45) Date of Patent: Jan. 31, 2023

(54) JOINT SPECTRUM ALLOCATION AND CACHE PLACEMENT IN A D2D NETWORK

(71) Applicant: Telefonaktiebolaget LM Ericsson (publ), Stockholm (SE)

(72) Inventors: Gary Boudreau, Kanata (CA); Yujie Xu, Toronto (CA); Ben Liang, Whitby (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 138 days.

(21) Appl. No.: 17/258,298

(22) PCT Filed: Jul. 29, 2019

(86) PCT No.: PCT/IB2019/056457
§ 371 (c)(1),
(2) Date: Jan. 6, 2021

(87) PCT Pub. No.: WO2020/026121
PCT Pub. Date: Feb. 6, 2020

(65) Prior Publication Data
US 2021/0274330 A1    Sep. 2, 2021

Related U.S. Application Data

(60) Provisional application No. 62/711,821, filed on Jul. 30, 2018.

(51) Int. Cl.
*H04W 72/12* (2009.01)
*H04W 4/70* (2018.01)
(Continued)

(52) U.S. Cl.
CPC ............. *H04W 4/70* (2018.02); *H04W 72/02* (2013.01); *H04W 72/0453* (2013.01); *H04W 76/23* (2018.02)

(58) Field of Classification Search
None
See application file for complete search history.

(56) References Cited

U.S. PATENT DOCUMENTS

| 9,578,099 B2 * | 2/2017 | Llorca | H04L 67/63 |
| 2015/0055557 A1 * | 2/2015 | Dong | H04W 72/02 370/328 |
| 2016/0100350 A1 * | 4/2016 | Laraqui | H04W 88/02 370/328 |

(Continued)

OTHER PUBLICATIONS

Jiajia Liu et al., "Device-to-Device Communication in LTE-Advanced Networks: A Survey"; IEEE Communication Surveys & Tutorials, vol. 17, No. 4, Fourth Quarter 2015; consisting of 18 pages; pp. 1923-1940.

(Continued)

*Primary Examiner* — Sai Aung
(74) *Attorney, Agent, or Firm* — Sage Patent Group

(57) ABSTRACT

A method, system and apparatus are disclosed. A network node is configured to communicate with a wireless device, WD, where the network node configured to, and/or comprising a radio interface and/or comprising processing circuitry configured to: receive an indication whether the WD is to cache at least one file based on spatial statistics of a cache-enabled device-to-device, D2D, network collected by the WD, and perform spectrum allocation based on the received indication.

24 Claims, 13 Drawing Sheets

(51) Int. Cl.
H04W 76/23 (2018.01)
H04W 72/02 (2009.01)
H04W 72/04 (2009.01)

(56) References Cited

U.S. PATENT DOCUMENTS

2016/0338031 A1* 11/2016 Wang ............... H04W 28/14
2017/0019495 A1* 1/2017 Bennis ............. H04L 67/1051
2018/0167354 A1* 6/2018 Lafragette .......... H04L 67/51

OTHER PUBLICATIONS

Ejder Bastug et al., "Living on the Edge: the Role of Proactive Caching in 5G Networks"; Context-Aware Networking and Communications; IEEE Communications Magazine, Aug. 2014; consisting of 8 pages; pp. 82-89.
Karthikeyan Shanmugam et al., "FemtoCaching: Wireless Content Delivery Through Distributed Caching Helpers"; IEEE Transactions on Information Theory, vol. 59, No. 12, Dec. 2013; consisting of 12 pages; pp. 8402-8413.
Negin Golrezaei et al., "Wireless Device-to-Device Communications with Distributed Caching"; 2012 IEEE International Symposium on Information Theory Proceedings; consisting of 5 pages; pp. 2781-2785.
Mingyue Ji et al., "The Throughput-Outage Tradeoff of Wireless One-Hop Caching Networks"; IEEE Transactions on Information Theory, vol. 61, No. 12, Dec. 2015; consisting of 27 pages; pp. 6833-6859.
Mingyue Ji et al., "Wireless Device-to-Device Caching Networks: Basic Principles and System Performance"; IEEE Journal on Selected Areas in Communications, vol. 34, No. 1, Jan. 2016; consisting of 14 pages; pp. 176-189.
Konstantinos Poularakis et al., "Caching and Operator Cooperation Policies for Layered Video Content Delivery"; IEEE Infocom 2016—the 35th Annual IEEE International Conference on Computer Communications; consisting of 9 pages.
Konstantinos Poularakis et al., "Video Delivery Over Heterogenous Cellular Networks: Optimizing Cost and Performance"; IEEE Infocom 2014—IEEE Conference on Computer Communications; consisting of 9 pages; pp. 1078-1086.
Binbin Dai et al., "Joint User Association and Content Placement for Cache-Enabled Wireless Access Networks"; Department of Electrical and Computer Engineering, University of Toronto, Canada; IEEE International Conference on Acoustics, Speech and Signal Processing, Mar. 2016, consisting of 5 pages; pp. 3521-3525.
Binqiang Chen et al., "Cache-Enabled Device-to-Device Communications: Offloading Gain and Energy Cost"; IEEE Transactions on Wireless Communications, vol. 16, No. 7, Jul. 2017; consisting 18 pages; pp. 4519-4536.
Yinghao Guo et al., "Cooperative Local Caching Under Heterogeneous File Preferences"; IEEE Transactions on Communications, vol. 65, No. 1, Jan. 2017; consisting of 14 pages; pp. 444-457.
Shankar Krishnan et al., "Distributed Caching in Device-to-Device Networks: A Stochastic Geometry Perspective"; IEEE; Asilomar 2015; consisting of 5 pages; pp. 1280-1284.
Derya Malak et al., "Optimizing Content Caching to Maximize the Density of Successful Receptions in Device-to-Device Networking"; IEEE Transactions on Communications, vol. 64, No. 10, Oct. 2016; consisting of 16 pages; pp. 4365-4380.

Seong Ho Chae, et al., "Cooperative Transmission Via Caching Helpers"; Department of Electrical Engineering, KAIST, Singapore University of Technology and Design (SUTD); IEEE 2015; consisting of 6 pages.
Zheng Chen et al., "D2D Caching vs. Small Cell Caching: Where to Cache Content in a Wireless Network?"; IEEE 2016; consisting of 6 pages.
Asma Afzal et al., "On the Analysis of Cellular Networks with Caching and Coordinated Device-to-Device Communication"; IEEE ICC 2016—Communications Theory; consisting of 7 pages.
Jun Rao et al., "Optimal Caching Placement for D2D Assisted Wireless Caching Networks"; IEEE ICC 2016—Wireless Communications Symposium; consisting of 6 pages.
Zheng Chen et al., "Probabilistic Caching in Wireless D2D Networks: Cache Hit Optimal Versus Throughput Optimal"; IEEE Communications Letters, vol. 21, No. 3, Mar. 2017; consisting of 4 pages; pp. 584-587.
Yue Wang et al, "Cooperative Caching Placement in Cache-Enabled D2D Underlaid Cellular Network"; IEEE communications Letters, vol. 21, No. 5, May 2017; consisting of 4 pages; pp. 1151-1154.
Seong Ho Chae et al., "Caching Placement in Stochastic Wireless Caching Helper Networks: Channel Selection Diversity Via Caching"; IEEE Transactions on Wireless Communications, vol. 15, No. 10, Oct. 2016; consisting of 12 pages; pp. 6626-6637.
Derya Malak, et al., "Spatially Correlated Content Caching for Device-to-Device Communications"; IEEE Transactions on Wireless Communications, vol. 17, No. 1, Jan. 2018; consisting of 15 pages; pp. 56-70.
Bartlomiej Blaszczyszyn et al., "Optimal Geographic Caching in Cellular Networks"; IEEE ICC 2015—Mobile and Wireless Networking Symposium; consisting of 6 pages; pp. 3358-3363.
Xingqin Lin et al., "Spectrum Sharing for Device-to-Device Communication in Cellular Networks"; IEEE Transactions on Wireless Communications, vol. 13, No. 12, Dec. 2014; consisting of 14 pages; pp. 6727-6740.
Kun Zhu et al., "Joint Mode Selection and Spectrum Partitioning for Device-to-Device Communication: A Dynamic Stackelberg Game"; IEEE Transactions on Wireless Communications, vol. No. 14, No. 3, Mar. 2015; consisting of 15 pages; pp. 1406-1420.
Wei Bao et al., "Rate Maximization Through Structured Spectrum Allocation and User Association in Heterogeneous Cellular Networks"; IEEE Transactions on Communications, vol. 63, No. 11, Nov. 2015; consisting of 15 pages; pp. 4510-4524.
Yicheng Lin, et al., "Optimizing User Association and Spectrum Allocation in HetNets: A Utility Perspective"; IEEE Journal on Selected Areas in Communications, vol. 33, No. 6, Jun. 2015; consisting of 15 pages; pp. 1025-1039.
Han-Shin Jo, et al., "Heterogeneous Cellular Networks with Flexible Cell Association: A Comprehensive Downlink SINR Analysis"; IEEE Transactions on Wireless Communications, vol. 11, No. 10, Oct. 2012; consisting of 12 pages; pp. 3484-3495.
International Search Report and Written Opinion dated Dec. 20, 2019 issued in PCT Application No. PCT/IB2019/056457, consisting of 13 pages.
Weiqi Sun, et al., "Joint Optimization of Cache Placement and Bandwidth Allocation in Heterogeneous Networks"; IEEE Access; vol. 6, Jul. 25, 2018; consisting of 11 pages; pp. 37250-37260.
Tiankui Zhang et al., "User Preference Aware Caching Deployment for Device-to-Device Caching Networks"; IEEE Systems Journal, vol. 13, No. 1, Mar. 2019; consisting of 12 pages; pp. 226-237.

* cited by examiner

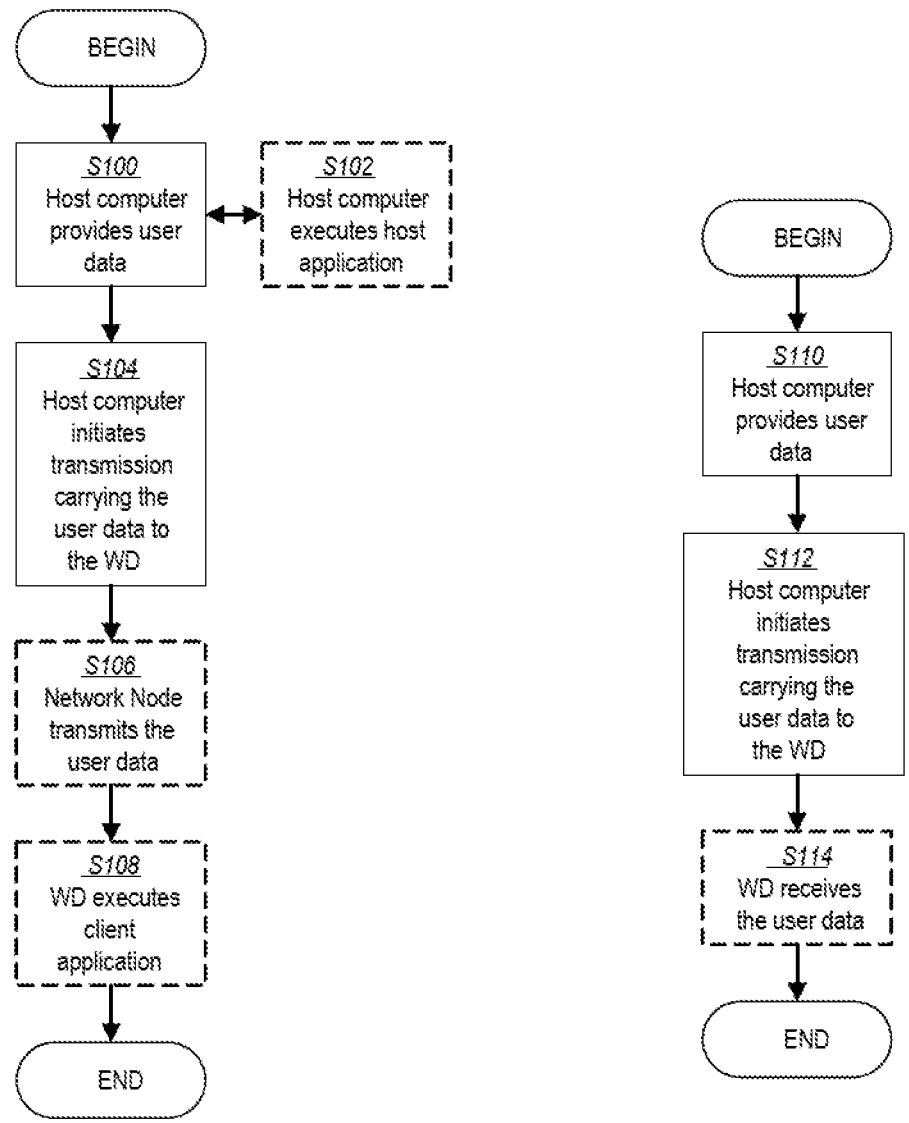

JOINT SPECTRUM ALLOCATION AND CACHE PLACEMENT IN A D2D NETWORK

CROSS-REFERENCE TO RELATED APPLICATIONS

This application is a Submission Under 35 U.S.C. § 371 for U.S. National Stage Patent Application of International Application No.: PCT/IB2019/056457, filed Jul. 29, 2019 entitled "JOINT SPECTRUM ALLOCATION AND CACHE PLACEMENT IN A D2D NETWORK," which claims priority to U.S. Provisional Application No. 62/711,821, filed Jul. 30, 2018, entitled "JOINT SPECTRUM ALLOCATION AND CACHE PLACEMENT IN A D2D NETWORK," the entireties of both of which are incorporated herein by reference.

TECHNICAL FIELD

The present disclosure relates to wireless communications, and in particular, to joint spectrum allocation and cache placement in a device-to-device (D2D) network.

BACKGROUND

Device-to-Device (D2D) communication allows for direct data transmission among devices to possibly provide a cost-effective way to further increase system throughput in future networks. One form of D2D communication is a cache-enabled D2D network. In a cache-enabled D2D network, devices cache files that are frequently requested by D2D devices in the network. The devices that cache files are referred to as D2D transmitters (DTxs) and those devices that request files are referred to as D2D receivers (DRxs). In a conventional cellular network, a DRx has to fetch its requested files from a base station (BS), which leads to large traffic loads for the BS. In a cache-enabled D2D network, the D2D devices may also download their requested files from nearby DTxs that store the files. This not only offloads traffic from the BSs, but also improves the file transfer data rate due to the short distance between devices.

However, while BSs may have enough storage space to cache most or all of the files in high demand or popular files, D2D devices may have limited storage capacity for caching of these files. Hence, cache placement design, i.e., how devices choose files to cache in order to meet different system requirements, may be an issue. Various cache placement strategies in cache-enabled D2D networks have been proposed under different network models. Some of these strategies may require knowledge of network topology or channel state information (CSI). For instance, one example network model is the protocol model. In this model, a D2D transmission link between a pair of devices may be activated if and only if the distance between a transceiver pair, i.e., pair of devices, is less than a distance threshold, and there is no other nearby activated link. The strategies developed under this model may require the DTx to acquire the exact network topology prior to making caching decisions. Acquiring the exact network topology or CSI can be a challenging task, especially for large networks. Therefore, random caching strategies based on a random network topology becomes more plausible to implement since they require less prior information. For example, DTxs randomly cache files according to some designed caching probabilities, which are computed based on the spatial statistics of the network, such as the density of DTx's and DRx's, and the requesting probability of the popular files.

In these random caching strategy systems, common design objectives may include cache hit probability, system throughput, density of successful reception, and local delay. Cache hit probability is the probability of the event where the distance between a DRx requesting files and a DTx caching the requested files is below a distance threshold. The density of successful reception refers to the average number of successful transmissions between a DRx requesting files and its nearest DTx caching the requested files in a unit area, while local delay is defined as the number of transmissions until the requested file is successfully transmitted. In these objectives, fairness among devices is not considered.

Furthermore, some existing random caching strategies were designed based on the assumption that a device can cache at most one file. This limits the application of these existing schemes to more general scenarios where devices can cache multiple files. While other existing system may allow devices to cache multiple files, these systems relax the original file storage constraint, i.e., from a constraint where a number of cached files cannot exceed K, into a constraint that the sum of the caching probability of each file cannot exceed K. Though this relaxation helps simplify the random caching strategy, it leads to the sub-optimal performance.

SUMMARY

Some embodiments advantageously provide methods and apparatuses for joint spectrum allocation and cache placement in a device-to-device (D2D) network. The disclosure provides methods, a system and nodes for spectrum allocation and random caching strategies to maximize the logarithm utility, with the knowledge of the spatial statistics of the network and the file requesting probability. Two example methods may include:
  As a first method, a random cache placement scheme of DTxs is defined with a fixed spectrum allocation between cellular and D2D communication to maximize the mean logarithm utility. The caching probabilities of different files are computed by solving a convex optimization problem.
  As a second method, joint spectrum allocation between cellular and D2D communication and cache placement is defined, to maximize the mean logarithm utility. A closed-form formula is provided to compute both the optimal spectrum allocation, and optimal caching strategy.

These example methods are described in detail below.

According to one aspect of the disclosure, a first wireless device configured to communicate with a second wireless device is provided. The first wireless device comprising processing circuitry configured to: determine to cache a first file of a plurality of files based at least in part on maximizing a mean log utility associated with the second wireless device.

According to one or more embodiments of this aspect, the mean log utility is based at least in part on: a probability of the second wireless device associating with the first wireless device to request the first file from the first wireless device, and a probability of the second wireless device associating with a network node to request the first file from the network node. According to one or more embodiments of this aspect, the mean log utility associated with the second wireless device is based at least in part on: a first mean log utility of the second wireless device associating with the first wireless device, and a second mean log utility of the second wireless device associating with a network node. According to one or more embodiments of this aspect, the processing circuitry is further configured to determine caching probabilities for the plurality of files, each caching probability corresponding to a probability of a file being requested by the second wireless device.

According to one or more embodiments of this aspect, the determination to cache the first file of the plurality of files is based at least in part on spatial statistics of a network. According to one or more embodiments of this aspect, the spatial statistics include at least one of a density of the network and allocated spectrum. According to one or more embodiments of this aspect, the spatial statistics include a requesting probability of the first file and respective densities of a network node, the first wireless device and second wireless device.

According to one or more embodiments of this aspect, the first file that is determined to be cached has a lower probability of being requested than at least one other file of the plurality of files that is not cached. According to one or more embodiments of this aspect, the processing circuitry is further configured to receive a spectrum allocation based at least in part on the maximizing of the mean log utility. According to one or more embodiments of this aspect, the caching of the first file of the plurality of files and the spectrum allocation is based at least in part on a metric, and the wireless device determining to cache the first file of the plurality of files and receiving the spectrum allocation if the metric is a positive value, and the wireless device determining not to cache the first file of the plurality of files and not receiving the spectrum allocation if the metric is a non-positive value.

According to another aspect of the disclosure, a method implemented by a first wireless device configured to communicate with a second wireless device is provided. A determination is made to cache a first file of a plurality of files based at least in part on maximizing a mean log utility associated with the second wireless device.

According to one or more embodiments of this aspect, the mean log utility is based at least in part on: a probability of the second wireless device associating with the first wireless device to request the first file from the first wireless device, and a probability of the second wireless device associating with a network node to request the first file from the network node. According to one or more embodiments of this aspect, the mean log utility associated with the second wireless device is based at least in part on: a first mean log utility of the second wireless device associating with the first wireless device, and a second mean log utility of the second wireless device associating with a network node.

According to one or more embodiments of this aspect, caching probabilities for the plurality of files is determined where each caching probability corresponds to a probability of a file being requested by the second wireless device. According to one or more embodiments of this aspect, the determination to cache the first file of the plurality of files is based at least in part on spatial statistics of a network. According to one or more embodiments of this aspect, the spatial statistics include at least one of a density of the network and allocated spectrum.

According to one or more embodiments of this aspect, the spatial statistics include a requesting probability of the first file and respective densities of a network node, the first wireless device and second wireless device. According to one or more embodiments of this aspect, the first file that is determined to be cached has a lower probability of being requested than at least one other file of the plurality of files that is not cached. According to one or more embodiments of this aspect, a spectrum allocation based at least in part on the maximizing of the mean log utility is received. According to one or more embodiments of this aspect, the caching of the first file of the plurality of files and the spectrum allocation is based at least in part on a metric. The wireless device determines to cache the first file of the plurality of files and receiving the spectrum allocation if the metric is a positive value. The wireless device determines not to cache the first file of the plurality of files and not receiving the spectrum allocation if the metric is a non-positive value.

According to another aspect of the disclosure, a network node configured to communicate with a first wireless device is provided. The network node comprising processing circuitry configured to: receive an indication whether the first wireless device is to cache a first file of a plurality of files based at least in part on maximizing a mean log utility associated with a second wireless device, and perform spectrum allocation based at least in part on the received indication.

According to one or more embodiments of this aspect, the indication includes an indication of a caching metric, and if the caching metric is a positive value, the spectrum is allocated to cellular communications and device-to-device communications between the first and second wireless devices. According to one or more embodiments of this aspect, the indication includes an indication of a caching metric, and if the caching metric is a non-positive value, the spectrum is allocated to cellular communications without allocating spectrum for device-to-device communications between the first and second wireless devices. According to one or more embodiments of this aspect, the indication is based at least in part on spatial statistics associated with of a network. According to one or more embodiments of this aspect, the spatial statistics include at least one of: a density of the network, a density of the allocated spectrum, and a requesting probability of the first file.

According to another aspect of the disclosure, a method implemented in a network node configured to communicate with a first wireless device is provided. An indication whether the first wireless device is to cache a first file of a plurality of files based at least in part on maximizing a mean log utility associated with a second wireless device is received. Spectrum allocation is performed based at least in part on the received indication.

According to one or more embodiments of this aspect, the indication includes an indication of a caching metric, and if the caching metric is a positive value, the spectrum is allocated to cellular communications and device-to-device communications between the first and second wireless devices. According to one or more embodiments of this aspect, the indication includes an indication of a caching metric, and if the caching metric is a non-positive value, the spectrum is allocated to cellular communications without allocating spectrum for device-to-device communications between the first and second wireless devices. According to one or more embodiments of this aspect, the indication is based at least in part on spatial statistics associated with of a network. According to one or more embodiments of this aspect, the spatial statistics include at least one of: a density of the network, a density of the allocated spectrum, and a requesting probability of the first file.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flow diagram for executing a client application in accordance with the principles of the disclosure;

FIG. 4 is a flow diagram for receiving user data in accordance with the principles of the disclosure;

DETAILED DESCRIPTION

Figure 1:
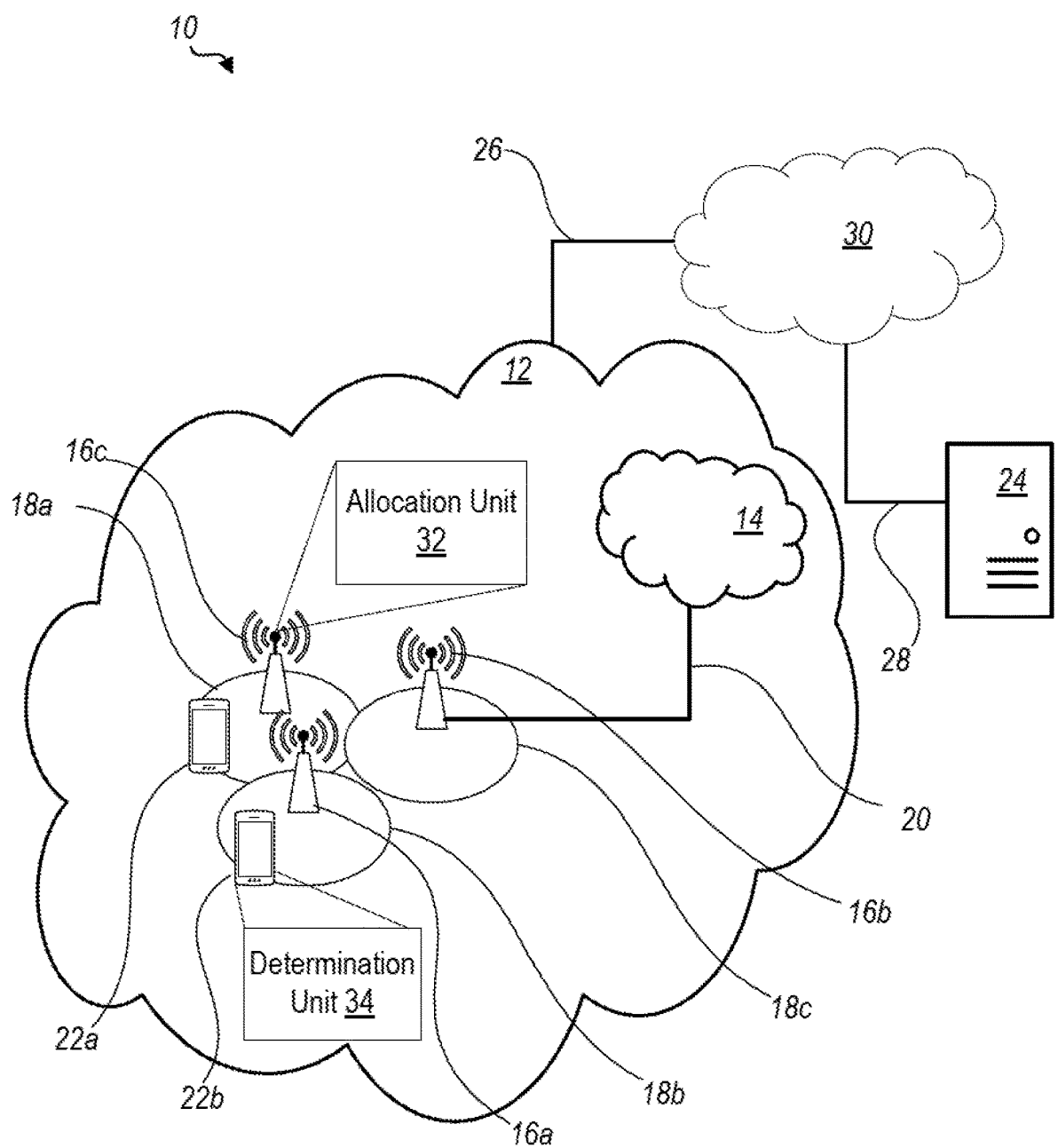
FIG. 1 is a schematic diagram of an exemplary network architecture illustrating a communication system connected via an intermediate network to a host computer according to the principles in the present disclosure.

Existing cache placement algorithms are not without problems. Some existing systems are based on the assumption that the exact network topology or CSI is known. The cache design in other existing systems is based on random topology. Specifically, some of these existing systems assume that the placement of devices and network nodes follow a Poison Point Process (PPP).

Different objectives are considered in the cache placement schemes. For example, throughput maximization may be considered, or logarithm utility of devices may be considered. Other existing systems focus on the delay in file delivery, or aim at maximizing the average cache hit probability. Furthermore, some existing systems consider the density of successful receptions, or focus on minimizing the probability of the event that a receiver in a D2D pair (DRx) fetches files from the network node. However, none of these works consider the well-known logarithm utility under the random network topology assumption.

Furthermore, some existing systems are based on the assumption that each device can cache only one file, while other systems allow multiple file caching in the transmitters in D2D pairs (DTxs). Some of the solutions of the caching problem are based on the assumption that the network topology or the CSI is known, or are based on relaxing the file storage constraint.

Some existing systems relate to spectrum allocation in a multi-tier network. Some of these existing systems consider optimal spectrum allocation between D2D and cellular communication to maximize the logarithm utility. In one example, the problem of joint mode selection and spectrum allocation between cellular and D2D communication from a game theory point of view has been explored. Some of these spectrum allocation solutions consider spectrum allocation in a two-tier network, while others investigate solutions with a multi-tier heterogeneous network (HetNet).

Yet other spectrum allocation solutions consider joint spectrum allocation and bias setting of each tier to maximize the average rate, while other solutions aim at maximizing the logarithm utility. However, none of these works consider cache placement in devices in a D2D network such that these existing solutions do not relate to joint spectrum allocation and cache placement in cache-enabled D2D networks. For example, an issue may arise in D2D networks where the spectrum allocation between cellular and D2D communication is in overlay mode. In overlay mode, D2D communication and cellular communication occupy orthogonal sub-spectrum, and there is no interference between D2D communication and cellular communication. Such spectrum allocation between cellular and D2D communication is well known. However, existing systems fail to address the problem of joint spectrum allocation and cache design in cache-enabled D2D networks.

The present disclosure solves at least part of this problem by optimizing the spectrum allocation between cellular and D2D communication and cache placement in devices to maximize the mean logarithm utility, a measure of the system throughput. For example, in one or more embodiments, the disclosure uses the logarithm utility to provide a balance between data rate and fairness. Furthermore, the disclosure considers the case where DTx can cache multiple files where the derived optimal caching strategy described in the disclosure is based on the original feasible set without relaxation.

Before describing in detail exemplary embodiments, it is noted that the embodiments reside primarily in combinations of apparatus components and processing steps related to joint spectrum allocation and cache placement in a device-to-device (D2D) network. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

The disclosure provides one or more embodiments which can be implemented in multiple devices and network nodes able to perform scheduling and exchange information. The devices are capable of direct communication between devices (e.g., device to device communication). The network node herein can be the serving network node of the device or any network node with which the device can establish or maintain a communication link and/or receive information (e.g. via a broadcast channel).

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof. In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible to achieve the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), network controller, radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) or a radio network node.

In some embodiments, the non-limiting terms WD or a user equipment (UE) are used interchangeably. The WD herein can be any type of wireless device capable of communicating with a network node or another WD over radio signals, such as wireless device (WD). The WD may also be a radio communication device, target device, device to device (D2D) WD such as a transmitter in the D2D pair (DTx) and/or a receiver in the D2D pair (DRx), machine type WD or WD capable of machine to machine communication (M2M), low-cost and/or low-complexity WD, a sensor equipped with WD, tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" may be used. A radio network node can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), UTRA FDD, UTRA TDD, NR, Ultra Mobile Broadband (UMB) and Global System for Mobile Communications (GSM)/GERAN/EDGE, may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/ or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g., WD) may include scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements according to embodiments of the present disclosure.

Data may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

D2D communication (sidelink communication) may comprise transmission and/or reception of data. It may be considered that D2D communication may generally comprise and/or be defined by data being transmitted from one terminal, e.g., the transmitter or transmitter terminal, (in particular directly) to another terminal, e.g., the receiver or receiver terminal, in particular without the data transmitted being transmitted and/or relayed via a cellular network and/or base station or radio node of such. D2D communication may comprise relaying and/or hopping via a plurality of terminals. It may be considered that D2D communication is supported by a network, e.g., by the network and/or base station or radio node providing resource allocation, e.g., allocating resource pools for D2D communication. D2D communication may for example comprise D2D discovery transmission and/or D2D data transmission (the data may in particular be user data and/or payload data). Generally, D2D transmissions may be provided on resources used for UL and/or DL transmissions in cellular communication. However, in some variants, the resources may be UL resources (in the cellular context), e.g., as determined by a standard like LTE.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein. Returning to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an allocation unit 32 which is configured to allocate spectrum, i.e., resources. A wireless device 22 is configured to include a determination unit 34 which is configured to determine whether to cache at least one file at the wireless device 22, and optionally cache the at least one file based on the determination.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include an information unit 54 configured to enable the service provider to provide information related to spectrum allocation and/or caching described herein. In one or more embodiments, the host computer 24 is configured to perform one or more functions, described herein, of network node 16 and/or WD 22.

The communication system 10 further includes a network node 16 provided in a communication system 10 and includes hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include allocation unit 32 configured to perform spectrum allocation and/or cache placement such as for joint spectrum allocation and cache placement, as described herein.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a determination unit 34 configured to perform cache placement such as for joint spectrum allocation and cache placement, as described herein.

Figure 2:
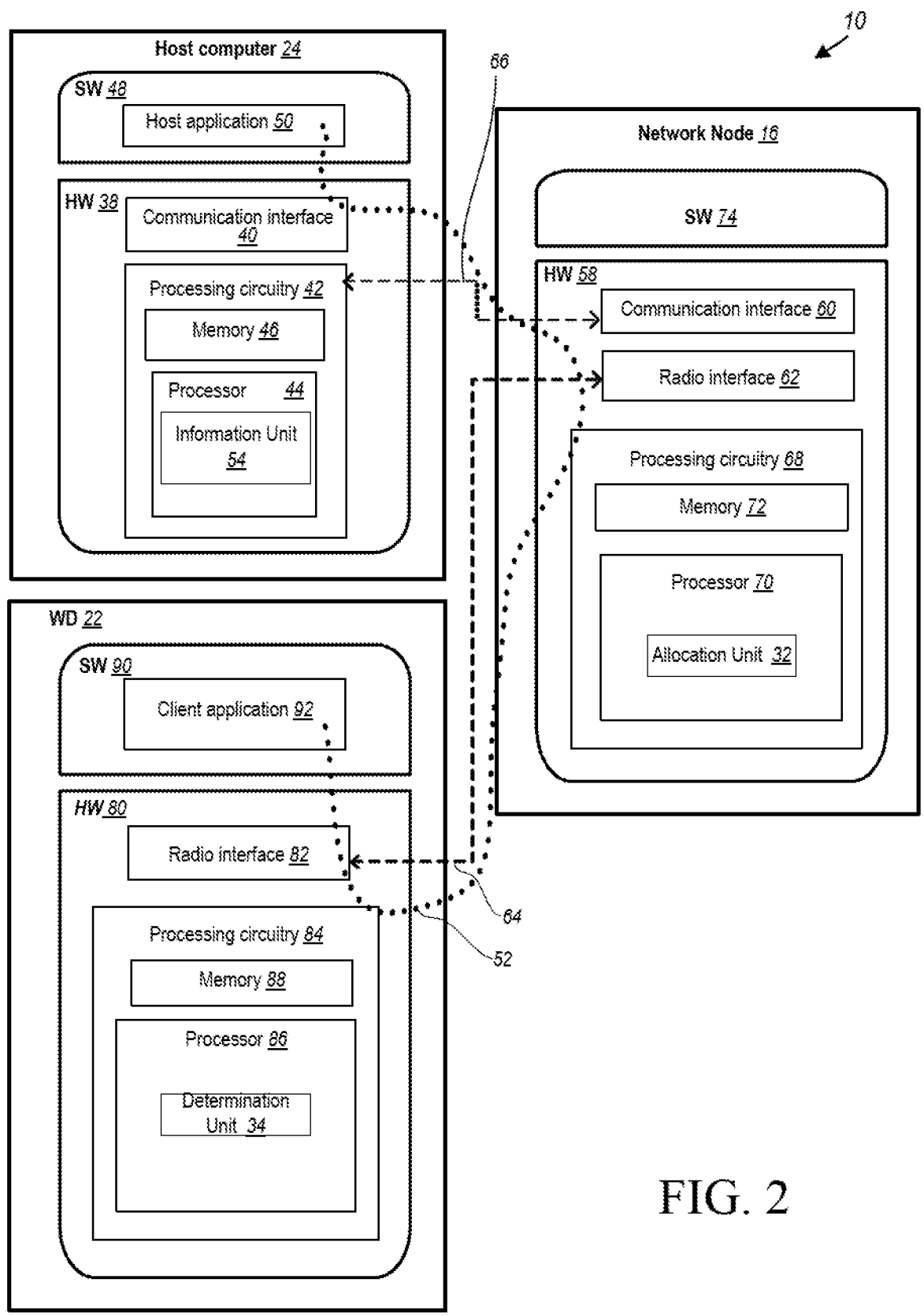
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as allocation unit 32, and determination unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 74 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 74 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 74. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 5, 6:
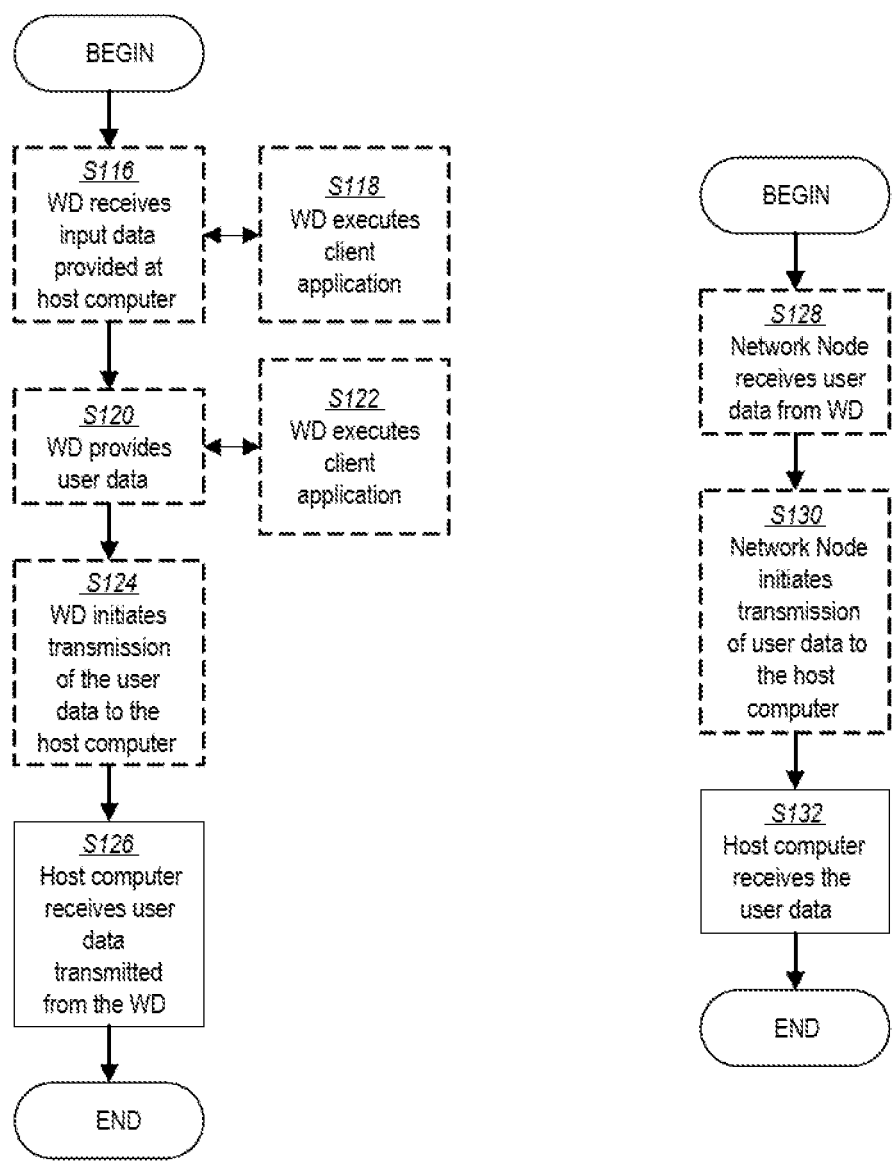
FIG. 5 is a flow diagram for receiving user data in accordance with the principles of the disclosure.
FIG. 6 are flow charts illustrating exemplary methods implemented in a communication system including a host computer, a network node and a wireless device according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
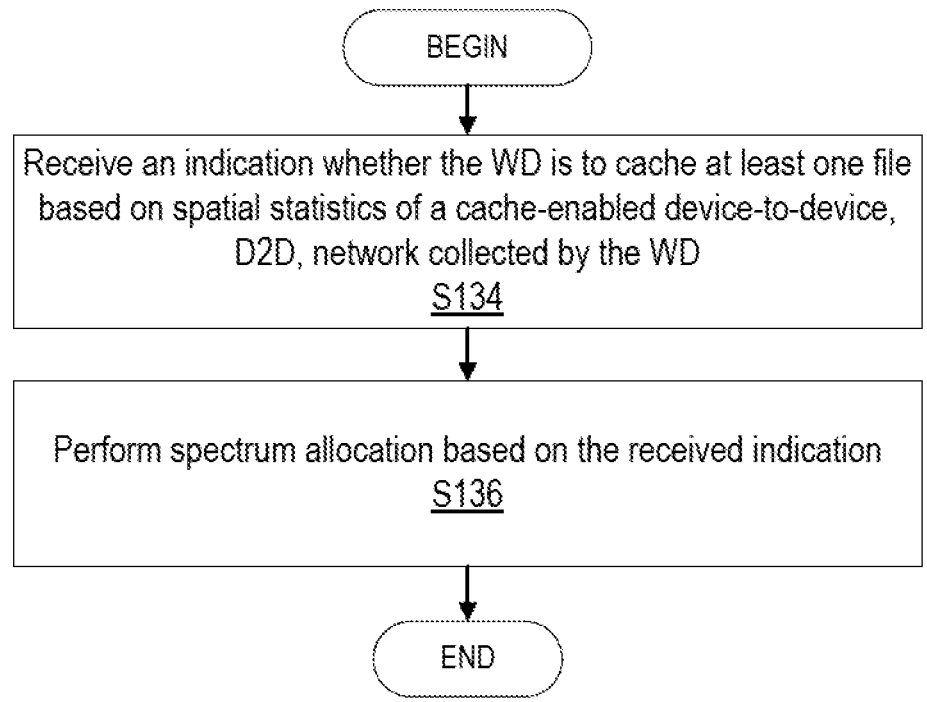
FIG. 7 is a flowchart of an exemplary process in a network node for allocation unit according to some embodiments of the present disclosure.

FIG. 7 is a flowchart of an exemplary process in a network node 16 for performing spectrum allocation such as for joint spectrum allocation and cache placement, as described herein. One or more Blocks and/or functions performed by network node 16 may be performed by one or more elements of network node 16 such as by one or more of allocation unit 32 in processing circuitry 68, processor 70, radio interface 62, etc. In one or more embodiments, network node 16 such as via one or more of processing circuitry 68, processor 70, communication interface 60, allocation unit 32 and radio interface 62 is configured to receive (Block S134) an indication whether the WD is to cache at least one file based on spatial statistics of a cache-enabled device-to-device, D2D, network collected by the WD. In one or more embodiments, network node 16 such as via one or more of processing circuitry 68, processor 70, communication interface 60, allocation unit 32 and radio interface 62 configured to perform (Block S136) spectrum allocation based on the received indication.

Figure 8:
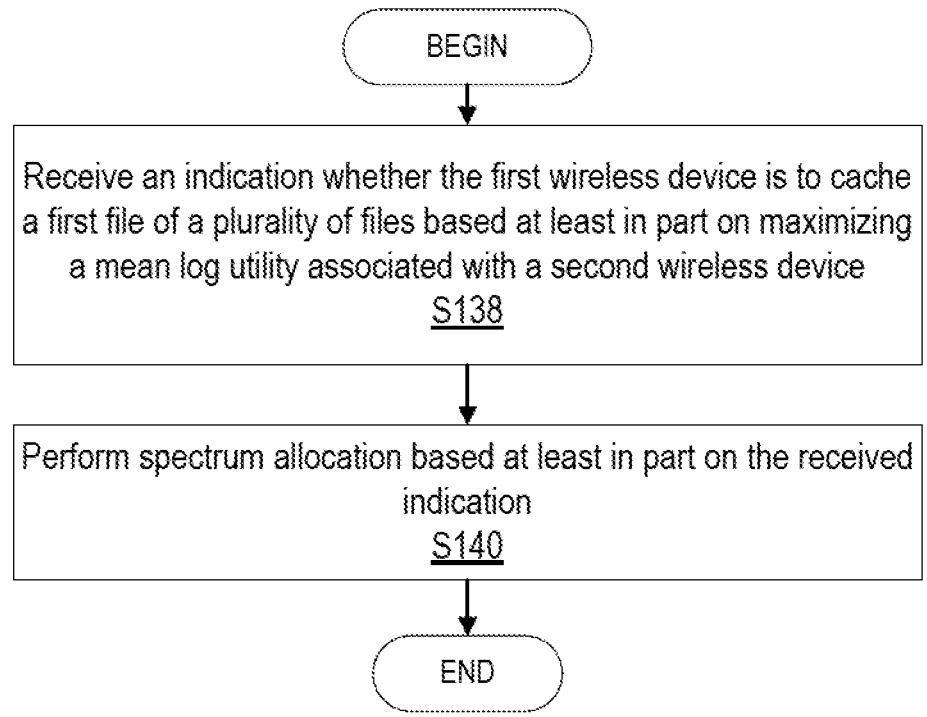
FIG. 8 is a flowchart of another exemplary process in a network node for allocation unit according to some embodiments of the present disclosure.

FIG. 8 is a flowchart of an exemplary process in a network node 16 according to one or more embodiments of the disclosure. One or more Blocks and/or functions performed by network node 16 may be performed by one or more elements of network node 16 such as by one or more of allocation unit 32 in processing circuitry 68, processor 70, radio interface 62, etc. In one or more embodiments, network node 16 such as via one or more of processing circuitry 68, processor 70, communication interface 60, allocation unit 32 and radio interface 62 is configured to receive (Block S138) an indication whether the first wireless device 22 is to cache a first file of a plurality of files based at least in part on maximizing a mean log utility associated with a second wireless device 22. In one or more embodiments, network node 16 such as via one or more of processing circuitry 68, processor 70, communication interface 60, allocation unit 32 and radio interface 62 is configured to perform (Block S140) spectrum allocation based at least in part on the received indication.

According to one or more embodiments, the indication includes an indication of a caching metric, where if the caching metric is a positive value, the spectrum is allocated to cellular communications and device-to-device communications between the first and second wireless devices 22. According to one or more embodiments, the indication includes an indication of a caching metric where if the caching metric is a non-positive value, the spectrum is allocated to cellular communications without allocating spectrum for device-to-device communications between the first and second wireless devices 22. According to one or more embodiments, the indication is based at least in part on spatial statistics associated with of a network. According to one or more embodiments, the spatial statistics include at least one of: a density of the network, a density of the allocated spectrum, and a requesting probability of the first file.

Figure 9:
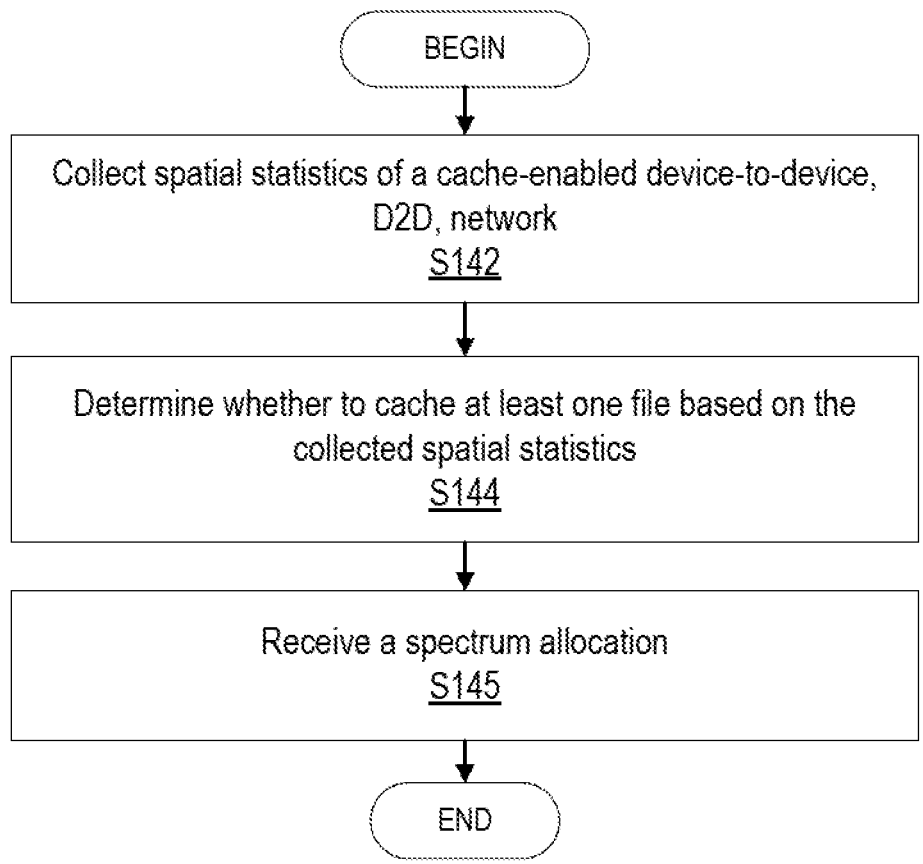
FIG. 9 is a flowchart of an exemplary process in a wireless device for determination unit according to some embodiments of the present disclosure.

FIG. 9 is a flowchart of an exemplary process in a wireless device 22 for cache placement such as for joint spectrum allocation and cache placement, as described herein. One or more Blocks and/or functions performed by wireless device 22 may be performed by one or more elements of wireless device 22 such as by one or more of determination unit 34 in processing circuitry 84, processor 86, radio interface 82, etc. In one or more embodiments, wireless device such as via one or more of processing circuitry 84, processor 86, determination unit 34 and radio interface 82 is configured to collect (Block S142) spatial statistics of a cache-enabled device-to-device, D2D, network, as described herein. In one or more embodiments, wireless device such as via one or more of processing circuitry 84, processor 86, determination unit 34 and radio interface 82 is further configured to determine (Block S144) whether to cache at least one file based on the collected spatial statistics, as described herein (Block S140), and to receive a spectrum allocation, as described herein. In one or more embodiments, wireless device such as via one or more of processing circuitry 84, processor 86, determination unit 34 and radio interface 82 is further configured to receive (Block S145) a spectrum allocation, as described herein.

Figure 10:
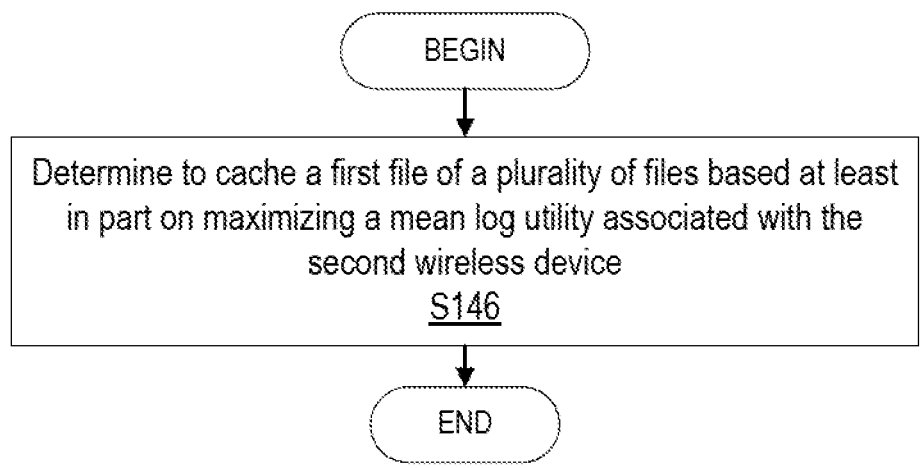
FIG. 10 is a flowchart of another exemplary process in a wireless device for determination unit according to some embodiments of the present disclosure.

FIG. 10 is a flowchart of an exemplary process in a wireless device 22 according to one or more embodiments of the disclosure. One or more Blocks and/or functions performed by wireless device 22 may be performed by one or more elements of wireless device 22 such as by one or more of determination unit 34 in processing circuitry 84, processor 86, radio interface 82, etc. In one or more embodiments, wireless device such as via one or more of processing circuitry 84, processor 86, determination unit 34 and radio interface 82 is configured to determine (Block S146) to cache a first file of a plurality of files based at least in part on maximizing a mean log utility associated with the second wireless device 22.

According to one or more embodiments, the mean log utility is based at least in part on: a probability of the second wireless device 22 associating with the first wireless device 22 to request the first file from the first wireless device 22, and a probability of the second wireless device 22 associating with a network node 16 to request the first file from the network node 16. According to one or more embodiments, the mean log utility associated with the second wireless device 22 is based at least in part on: a first mean log utility of the second wireless device 22 associating with the first wireless device 22, and a second mean log utility of the second wireless device 22 associating with a network node 16.

According to one or more embodiments, the processing circuitry 84 is further configured to determine caching probabilities for the plurality of files, each caching probability corresponding to a probability of a file being requested by the second wireless device 22. According to one or more embodiments, the determination to cache the first file of the plurality of files is based at least in part on spatial statistics of a network. According to one or more embodiments, spatial statistics include at least one of a density of the network and allocated spectrum. According to one or more embodiments, the spatial statistics include a requesting probability of the first file and respective densities of a network node 16, the first wireless device 22 and second wireless device 22.

According to one or more embodiments, the first file that is determined to be cached has a lower probability of being requested than at least one other file of the plurality of files that is not cached. According to one or more embodiments, the processing circuitry 84 is further configured to receive a spectrum allocation based at least in part on the maximizing of the mean log utility. According to one or more embodiments, the caching of the first file of the plurality of files and the spectrum allocation is based at least in part on a metric. The wireless device 22 determining to cache the first file of the plurality of files and receiving the spectrum allocation if the metric is a positive value. The wireless device 22 determining not to cache the first file of the plurality of files and not receiving the spectrum allocation if the metric is a non-positive value.

Having generally described arrangements for cache placement or joint spectrum allocation and cache placement, details for these arrangements, functions and processes are provided as follows, and which may be implemented by the network node 16, wireless device 22 and/or host computer 24. In particular, in one or more embodiments, joint spectrum allocation and cache placement may generally refer to performing spectrum allocation by taking into consideration cache placement and/or performing caching placement by taking into consideration spectrum allocation.

Figure 11:
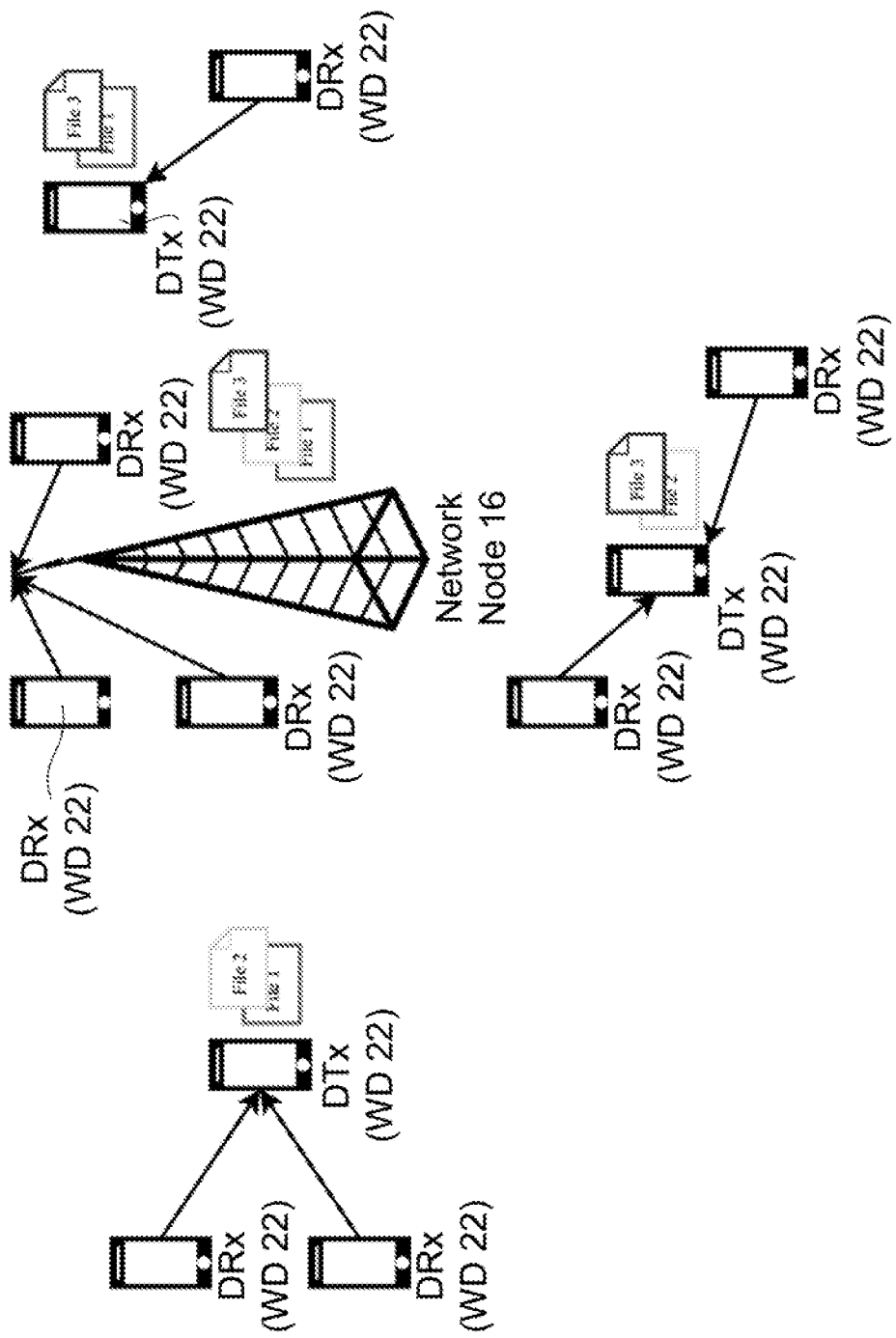
FIG. 11 is a block diagram of a system in accordance with the principles of the disclosure.

One example considers a D2D network, where network node 16, e.g., base station, is overlaid by a transmitter in a D2D pair (DTxs) and a receiver in the D2D pair (DRxs), as shown in FIG. 11. DTxs and DRxs may be wireless devices 22, as described herein. DTxs are equipped with some storage capacity to cache popular files requested by DRxs whereas network node 16 caches at least most of the popular files or files in high demand. In one or more embodiments, "popular file" may refer to a file that has been requested at least a predefined number of times within a predefined time period. Each DRx may request only one file. It is assumed that the locations of network nodes 16, DTxs (WD 22), and DRxs (WD 22) follow independent homogeneous Poisson Point Processes (PPPs) with intensities of $\lambda_0$, $\lambda_1$, and $\mu$, respectively. It is further assumed that $\lambda_0 \ll \mu$ and $\lambda_1 \ll \mu$.

The following association rule is considered: A DRx associates with a DTx caching its requested file if its long-term averaged received power from this DTx is larger than that from other DTxs and all network nodes 16. If no such DTx is found, the DRx associates with the nearest network node 16.

In one or more embodiments, it is assumed that the D2D network operates in overlay mode, so that there is no interference between cellular and D2D communication. The total spectrum may be divided into two orthogonal sub-bands for cellular and D2D communication. For simplicity, the bandwidth of the total spectrum is normalized to 1. In one or more embodiments, $\eta_0$ and $\eta_1$ denote the portion of spectrum allocated to cellular and D2D communication, respectively. It may be assumed that each network node 16 and DTx allocates an equal amount of spectrum to its associated DRxs.

The transmission power of the network node 16 and DTx, denoted by $P_0$ and $P_1$ respectively, may be fixed. The network node 16, DTxs, and DRxs may all be equipped with a single antenna. Let x and y be the coordinates of one transmitter (network node 16 or DTx) and one DRx respectively. The receiving power of DRx located at y from the transmitter located at x is given by $$P_{x,y} = \frac{P_x h_{x,y}}{|x-y|^\gamma},$$

where $\gamma$ is the pathloss exponent, $P_x$ is the transmission power of the transmitter, and $h_{x,y}$ models the power fading term resulting from small scale fading. When the transmitter is a network node 16, $P_x=P_0$; and $P_x=P_1$, otherwise. It may be assumed that the small-scale fading is Rayleigh with unit mean.

It may be assumed that there exist N popular files of equal size in the network. The collection of those files is denoted by $\mathcal{N}=\{1, \ldots, N\}$. The probability of the event that file n is requested by a DRx is $q_n$. Without loss of generality, it is assumed that $q_i > q_j$ if $i < j$.

It may be assumed that each DTx has limited storage capacity and can cache at most K files, where K≤N. Let $\mathbb{F}^K = \{\mathcal{F} \mid \mathcal{F} \subseteq \mathcal{N} \mid \mathcal{F} \mid \leq K\}$, so that $\mathbb{F}^K$ is the collection of all possible sets of files cached in a DTx, given the maximum number of cached files, K. Furthermore, $\mathbb{F}_i^K$ denotes the collection of file sets in $\mathbb{F}^K$ containing file i, i.e., $\mathbb{F}_i^K = \{\mathcal{F} \in \mathbb{F}^K \mid i \in \mathcal{F}\}$.

As one embodiment in the method, consider a random caching strategy in DTx. Let $p_\mathcal{F}$ be the probability of the event that a DTx caches files of set $\mathcal{F}$, where $\mathcal{F} \in \mathbb{F}^K$. Furthermore, each DTx randomly caches the files of set $\mathcal{F}$ based on the probability of $\{p_\mathcal{F}\}$, where $$\sum_{\mathcal{F} \in \mathbb{F}^K} p_\mathcal{F} = 1.$$

The system is assumed to be interference-limited, and that the impact of noise can be ignored. For analytical derivation in this disclosure, a single SIR threshold, T is assumed to have been received. When the received signal to interference ratio (SIR) of a DRx is no less than T, the received data rate is log (1+T), otherwise, it is 0. The coverage probability $P_{cover}$ is defined as the probability of the event that a DRx's received SIR is no less than T. In one or more embodiments, a DRx is assumed to be located at 0, and its coverage probability is given by $$P_{cover} = \mathbb{P}(SIR \geq T) = \mathbb{P}\left(\frac{\frac{P_x h_{x,0}}{|x|^\gamma}}{I_\Phi} \geq T\right) \stackrel{(a)}{=} \exp(-TP_x^{-1}|x|^\gamma I_\Phi), \quad (1)$$

where X is the location of its associated transmitter (network node 16 or DTx), and $$I_\Phi = \sum_{z \in \Phi} \frac{P_z h_{z,0}}{|z|^\gamma}$$

is the sum interference received by the DRx, where $\Phi$ is the collection of locations of interfering transmitters. Equation (1) holds because of the assumption of Rayleigh small scale fading with unit mean.

The mean data rate of the DRx is $R_{cover} = \beta P_{cover} \log(1+T)$, where $\beta$ is the amount of spectrum allocated to the DRx.

The coverage-rate-based logarithm utility of the DRx is defined as $$U = \mathbb{E}_{\Phi, x, \{h_{x,0}\}}[\log(R_{cover})] =$$

$$\mathbb{E}_{\Phi, x, \{h_{x,0}\}}[\log(\beta)] + \mathbb{E}_{\Phi, x, \{h_{x,0}\}}[\log(P_{cover})] + \log[\log(1+T)].$$

The problem of joint spectrum allocation and cache placement to maximize the mean logarithm utility is formulated as $$\max_{\{[p_\mathcal{F}], \eta_0, \eta_1\}} \overline{U}$$

$$\text{s.t.} \sum_{\mathcal{F} \in \mathbb{F}^K \setminus \{\emptyset\}} p_\mathcal{F} \leq 1,$$

$$p_\mathcal{F} \geq 0,$$

$$\mathcal{F} \in \mathbb{F}^K,$$

$$\eta_0 + \eta_1 \leq 1,$$

$$\eta_0 \geq 0,$$

$$\eta_1 \geq 0.$$

where $\overline{U}$ is the mean logarithm utility of a DRx. The first and second constraints are probability constraints, and the third and fourth constraints are spectrum allocation constraints.

Close Form of Mean Logarithm Utility

For a typical DRx located at 0, the mean logarithm utility is derived below. The association probability that the DRx associates with a DTx or network node 16 is derived. Then the logarithm utility of the DRx associated with the DTx or network node 16 is computed. After, the mean logarithm utility of the DRx is computed.

Define $$\begin{cases} \rho_0 = \dfrac{\lambda_0 P_0^{\frac{2}{\gamma}}}{\lambda_1 P_1^{\frac{2}{\gamma}} + \lambda_0 P_0^{\frac{2}{\gamma}}}, \\ \\ \rho_1 = \dfrac{\lambda_1 P_1^{\frac{2}{\gamma}}}{\lambda_1 P_1^{\frac{2}{\gamma}} + \lambda_0 P_0^{\frac{2}{\gamma}}}. \end{cases}$$

Furthermore, conditioning on the event that the DRx requests file i, Let $E_i^0$ and $E_{\mathcal{F},i}^1$ be the event that the DRx associates with either a network node 16 or a DTx (which implies that the DTx has cached a file set $\mathcal{F}$ where $\mathcal{F} \in \mathbb{F}_i^K$), respectively.

Association Probability

The following association probabilities are conditioned on the event that the DRx requires file i. The probability that the DRx associates with network node 16 is given by $$A_i^0 = \mathbb{P}(E_i^0) = p_0 + (1-p_i)\rho_1,$$

$$\text{where } p_i = \sum_{\mathcal{F} \in \mathbb{F}_i^K} p_{\mathcal{F}}.$$

The probability that the DRx associates with a DTx which caches a file set $\mathcal{F}$ where $\mathcal{F} \in \mathbb{F}_i^K$, is given by $$A_{\mathcal{F},i}^1 = \mathbb{P}(E_{\mathcal{F},i}^1) = p_{\mathcal{F}}\rho_1.$$

Mean Logarithm of Coverage Probability

The following logarithm of coverage probability is conditioned on the event that the DRx requires file i.

$C_i^0(d)$ denotes the logarithm of coverage probability given that the DRx associates with a network node 16, and the distance between them is d, which provides for:

$$C_i^0(d) = \mathbb{E}_{\Phi,x,\{h_{z,0}\}}[\log(P_{cover})||x| = d, E_i^0] = -\frac{2\pi T \lambda_0}{\gamma - 2} d^2.$$

Further, $f_i^0(d)$ denotes the pdf of distance between a DRx and the associated network node 16, which provides for:

$$f_i^0(d) = \frac{2\pi \lambda_0}{A_i^0} d\left[p_i \exp\left(-\pi d^2 \frac{\lambda_0}{\rho_0}\right) + (1-p_i)\exp(-\pi d^2 \lambda_0)\right].$$

$C_i^0$ denotes the logarithm of coverage probability given that the DRx associates with network node 16, which provides for $$C_i^0 = \mathbb{E}_{\Phi,x,\{h_{z,0}\}}[\log(P_{cover})|E_i^0] = \int_0^\infty C_i^0(d)f_i^0(d)dd = -2T\frac{1-(1-\rho_0^2)p_i}{A_i^0(\gamma-2)}.$$

Further, $C_{\mathcal{F},i}^1$ denotes the logarithm of coverage probability given that the DRx associates with DTx which caches a file set $\mathcal{F}$ ($\mathcal{F} \in \mathbb{F}_i^K$), and the distance between them is d, which provides for:

$$C_{\mathcal{F},i}^1(d) = \mathbb{E}_{\Phi,x,\{h_{z,0}\}}[\log(P_{cover})||x| = d, E_{\mathcal{F},i}^1] = -\frac{2\pi T \lambda_1}{\gamma - 2} d^2.$$

Further, $f_{\mathcal{F},i}^1(d)$ denotes the pdf of distance between a DRx and the associated DTx which caches a file set $\mathcal{F}$ ($\mathcal{F} \in \mathbb{F}_i^K$), which provides for:

$$f_{\mathcal{F},i}^1(d) = \frac{2\pi \lambda_1}{A_{\mathcal{F},i}^1} dp_{\mathcal{F}} \exp\left(-\pi d^2 \frac{\lambda_1}{\rho_1}\right).$$

Also, $C_{\mathcal{F},i}^1$ denotes the logarithm of coverage probability given that the DRx associates with DTx which caches a file set $\mathcal{F}$ ($\mathcal{F} \in \mathbb{F}_i^K$), which provides for:

$$C_{\mathcal{F},i}^1 = \mathbb{E}_{\Phi,x,\{h_{z,0}\}}[\log(P_{cover})||x| = d, E_{\mathcal{F},i}^1] =$$

$$\int_0^\infty C_{\mathcal{F},i}^1(d)f_{\mathcal{F},i}^1(d)dd = -2T \frac{\rho_1^2 p_{\mathcal{F}}}{A_{\mathcal{F},i}^1(\gamma - 2)}.$$

Mean Logarithm of DRx's Allocated Spectrum

Each network node 16 or DTx may be assumed to allocate an equal amount of resources to each of its associated DRxs.

The coverage-rate-based utility contains a term $\mathbb{E}_{\Phi,x\{h_z,0\}}[\log(\beta)]$, where $\beta$ is the spectrum allocated to the DRx. It may be difficult to track this term analytically. Hence, the following approximation may be used:

$$\mathbb{E}_{\Phi,x,\{h_{z,0}\}}[\log(\beta)] \approx \log\frac{\eta}{M},$$

where $\eta$ is the spectrum allocated to the transmitter (network node 16 or DTx), and M is the average number of DRxs associating with the transmitter. In Method 1, $\eta$ is given. In Method 2, $\eta$ depends on the caching probabilities, $\{p_{\mathcal{F}}\}$. In either case, $\eta$ does not depend on $\Phi$, x, or $\{h_x, 0\}$.

The following logarithm of coverage probability is conditioned on the event that the DRx requires file i.

The average number of DRxs associating with a network node 16 is given by $$M^0 = \sum_{j=1}^N \frac{\mu q_j A_j^0}{\lambda_0} = \frac{\mu}{\lambda_0}\left(1 - \rho_1 \sum_{j=1}^N q_j p_j\right).$$

Given that the DRx associates with a network node 16, the mean logarithm of the amount of spectrum allocated to the DRx is approximated as $$\mathbb{E}_{\Phi,x,\{h_{z,0}\}}[\log(\beta) | E_i^0] = \log \frac{\eta_0}{\frac{\mu}{\lambda_0}\left(1 - \rho_1 \sum_{j=1}^N q_j p_j\right)}.$$

The average number of DRxs associating with a DTx that caches a file set $\mathcal{F}$ ($\mathcal{F} \in \mathbb{F}_i^K$) is given by $$M_{\mathcal{F},i}^1 = \sum_{j \in \mathcal{F}} \frac{\mu q_j A_{\mathcal{F},j}^1}{\lambda_1 p_{\mathcal{F}}} = \sum_{j \in \mathcal{F}} \frac{\mu}{\lambda_1} q_j \rho_1 = \frac{\mu}{\lambda_1} q_{\mathcal{F}} \rho_1,$$

where $$q_{\mathcal{F}} = \sum_{i \in \mathcal{F}} q_i.$$

Given that the DRx associates with a DTx that caches a file set $\mathcal{F}(\mathcal{F} \in \mathbb{F}_i^K)$, $K_{\mathcal{F},i}^1$, the mean logarithm of the amount of spectrum allocated to the DRx is approximated as $$\mathbb{E}_{\Phi,x,\{h_{z,0}\}}[\log(\beta)|E_{\mathcal{F},i}^1] = \log\frac{\eta_1}{\frac{\mu}{\lambda_1}q_{\mathcal{F}}\rho_1}.$$

Mean Logarithm Utility

Given that the DRx requires file i and associates with a network node 16, the mean logarithm utility of the typical DRx, $\overline{U}_i^0$ is given by $$\overline{U}_i^0 = \log\left(\frac{\eta_0}{\frac{\mu}{\lambda_0}\left(1 - \rho_1\sum_{j=1}^N q_j p_j\right)}\right) - 2T\frac{1 - (1 - \rho_0^2)p_i}{(\gamma - 2)A_i^0} + \log[\log(1 + T)].$$

Furthermore, given that the DRx requires file i and associates with a DTx which caches a file set $\mathcal{F}(\mathcal{F} \in \mathbb{F}_i^K)$, the mean logarithm utility of the typical DRx, $\overline{U}_{\mathcal{F},i}^1$, is given by $$\overline{U}_{\mathcal{F},i}^1 = \log\left(\frac{\eta_1}{\frac{\mu}{\lambda_1}q_{\mathcal{F}}\rho_1}\right) - 2T\frac{\rho_1^2 p_{\mathcal{F}}}{A_{\mathcal{F},i}^1(\gamma - 2)} + \log[\log(1 + T)].$$

Finally, the mean utility of the typical DRx can be computed by $$\overline{U} = \sum_{i=1}^N q_i\left(A_i^0\overline{U}_i^0 + \sum_{\mathcal{F} \in \mathbb{F}_i^K} A_{\mathcal{F},i}^1 \overline{U}_{\mathcal{F},i}^1\right).$$

Method 1: Optimal Random Cache Placement with Fixed Spectrum Allocation

If $\{\overline{U}\}$ is expanded, it can be shown that the mean log utility is related to $\{p_{\mathcal{F}}\}$ and $\{\eta_0, \eta_1\}$. In Method 1, $\{p_{\mathcal{F}}\}$ is optimized to maximize $\{\overline{U}\}$. Note that in this optimization, the objective may be to have or try to achieve P1 be equal to $\{\overline{U}\}$–constant term. In other words, the above explanation corresponds to maximizing $\{\overline{U}\}$. Further, details are described below.

For any fixed spectrum allocation, i.e., $\{\eta_0, \eta_1\}$, the original optimization problem $\mathcal{P}$ is simplified as the following optimization problem, whose optimization variables are $\{p_{\mathcal{F}}\}$.

$$\mathcal{P}_1 \max_{\{p_{\mathcal{F}}\}} B\sum_{i=1}^N q_i p_i -$$

$$\left(1 - \rho_1\sum_{i=1}^N q_i p_i\right)\log\left(1 - \rho_1\sum_{i=1}^N q_i p_i\right) - \rho_1\sum_{i=1}^N q_i\sum_{\mathcal{F} \in \mathbb{F}_i^K} p_{\mathcal{F}}\log(q_{\mathcal{F}})$$

$$\text{s.t.} \sum_{\mathcal{F} \in \mathbb{F}^K\setminus\{\emptyset\}} p_{\mathcal{F}} \leq 1$$

$$p_{\mathcal{F}} \geq 0,$$

$$\mathcal{F} \in \mathbb{F}^K,$$

where $$B = \rho_1\left(\log\left(\frac{\eta_1\lambda_1}{\eta_0\lambda_0\rho_1}\right) + \frac{4T\rho_0}{\gamma - 2}\right).$$

It can be shown that problem $\mathcal{P}_1$ is convex.

Randomly Cache with Fixed Spectrum Allocation Details of Method 1

Each DTx collects the spatial statistics of the network including the density of the network node 16, DTx, and DRx, the spectrum allocated for cellular and D2D communication (e.g., the network node 16 may communicate to the DTx the spectrum allocation), and the requesting probability of the popular files in the network.

Each DTx solves optimization problem $\mathcal{P}_1$ and achieves its optimal solution $\{p_{\mathcal{F}}^*\}$.

Each DTx randomly caches files based on the probabilities $\{p_{\mathcal{F}}^*\}$, i.e., caches files in set $\mathcal{F}$ with probability $p_{\mathcal{F}}^*$.

In one or more embodiments, the network node 16 determines and communicates the fixed or predefined spectrum to the DTx such that the DTx may perform random caching knowing that the allocated spectrum is fixed.

Simulation Results

Two-File Case—Simulation Results

In two-file case subsection, a case is shown through which caching of the most popular files may not be the optimal strategy.

Two popular files in the network are considered. Each DTx can cache at most 1 file. The requesting probabilities of the first and the second file are 0.65 and 0.35 respectively. In addition, the following are set $$\lambda_0 = \frac{1}{2500 \text{ m}^2},$$

$$\lambda_1 = \frac{5}{2500 \text{ m}^2},$$

$$\mu = \frac{30}{2500 \text{ m}^2},$$

$$T = 1,$$

$$\frac{P_0}{P_1} = 2,$$

Figure 12:
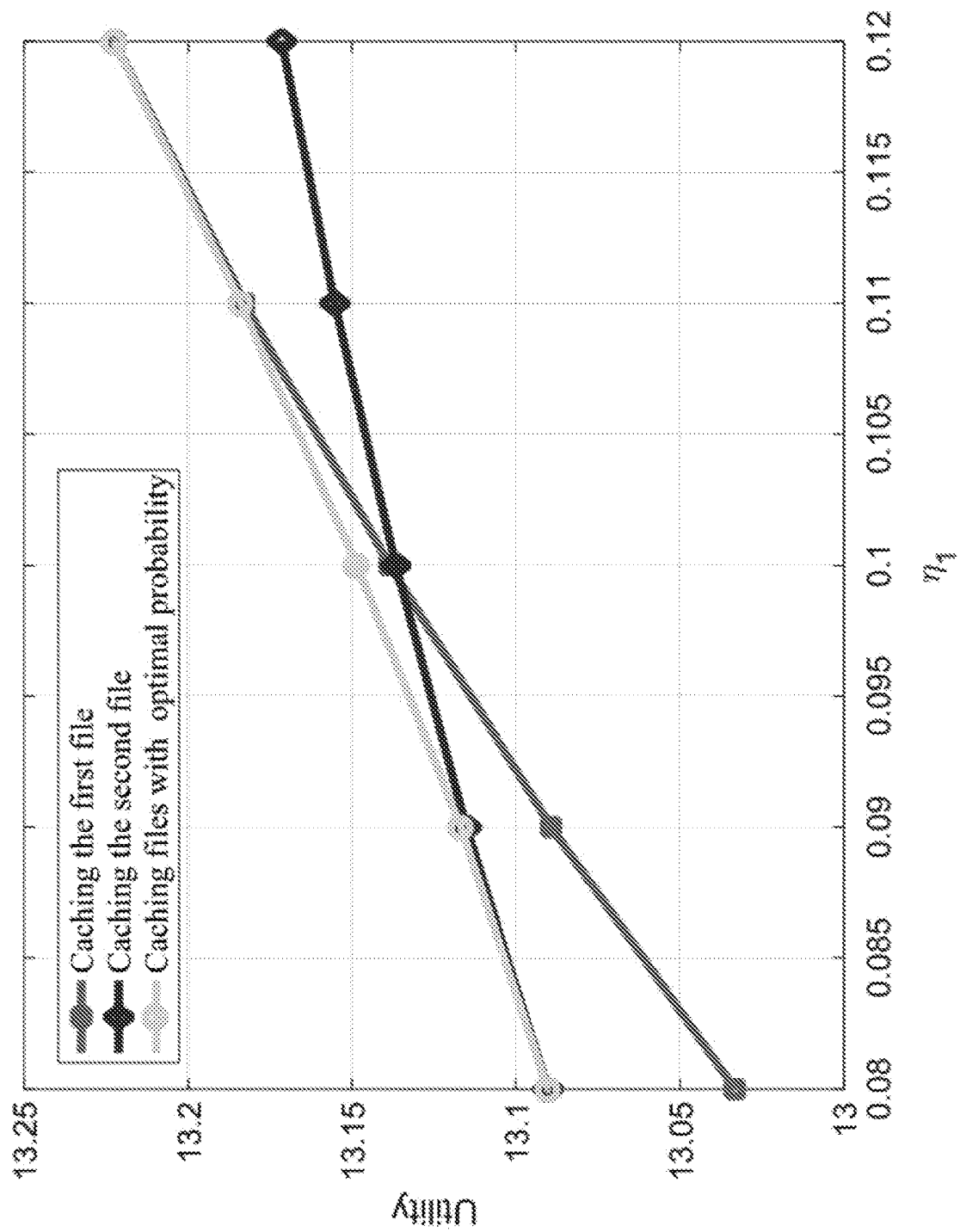
FIG. 12 is a graph of a logarithm utility versus portion of spectrum allocated to D2D communication in accordance with the principles of the disclosure.

$\gamma=6$, and W=20 MHz. In FIG. 12 (which illustrates a Logarithm utility versus portion of spectrum allocated to D2D communication) the changes of average logarithm utility of the DRxs versus the portion of spectrum allocated to D2D communication, $\eta_1$, are shown. When $n_1 \leq 0.08$, caching the second file is optimal or may provide caching performance meeting a threshold. When $\eta_1 \geq 0.12$, caching the first file is optimal or may provide caching performance meeting a threshold. When $\eta_1 \in [0.08, 0.12]$, random caching based on the probabilities computed by solving problem $\mathcal{P}_1$, is optimal or may provide caching performance meeting a threshold. Hence, caching the most popular file may not be the optimal caching strategy in some cases.

Multiple-File Case-Simulation Results

The performance of Method 1 is evaluated, and the no caching scheme is also evaluated. In Method 1, the spectrum is divided into two equal sub-spectrums for D2D and cellular communication, and the caching strategy is the optimal caching strategy under fixed spectrum allocation. In the no caching scheme, each DRx downloads its requested file from a network node 16. The default system simulation parameters are in Table I. The simulation results are averaged over 1000 PPP realizations. Although a single-threshold rate model is used in the analysis, the performance under a Shannon rate model is described, where the rate is computed as log (1+SIR).

TABLE 1

Default simulation parameters

| | |
|---|---|
| Transmission power of network node 16 | 40 W |
| Transmission power of DTx | 0.25 W |
| Density of network node 16 | $\frac{1}{2500 \text{ m}^2}$ |
| Density of DTx | $\frac{5}{2500 \text{ m}^2}$ |
| Pathloss exponent | 4 |
| Bandwidth | 20 MHz |
| Number of popular files | 10 |
| SIR threshold | 1 |
| Maximum number of cached files in a DTx | 3 |
| File requesting probability model | Zip's distribution, $q_i = \frac{i^\theta}{\sum_{j=1}^{N} j^\theta}$ |
| Exponent of Zip's distribution | 1 |

Figure 13:
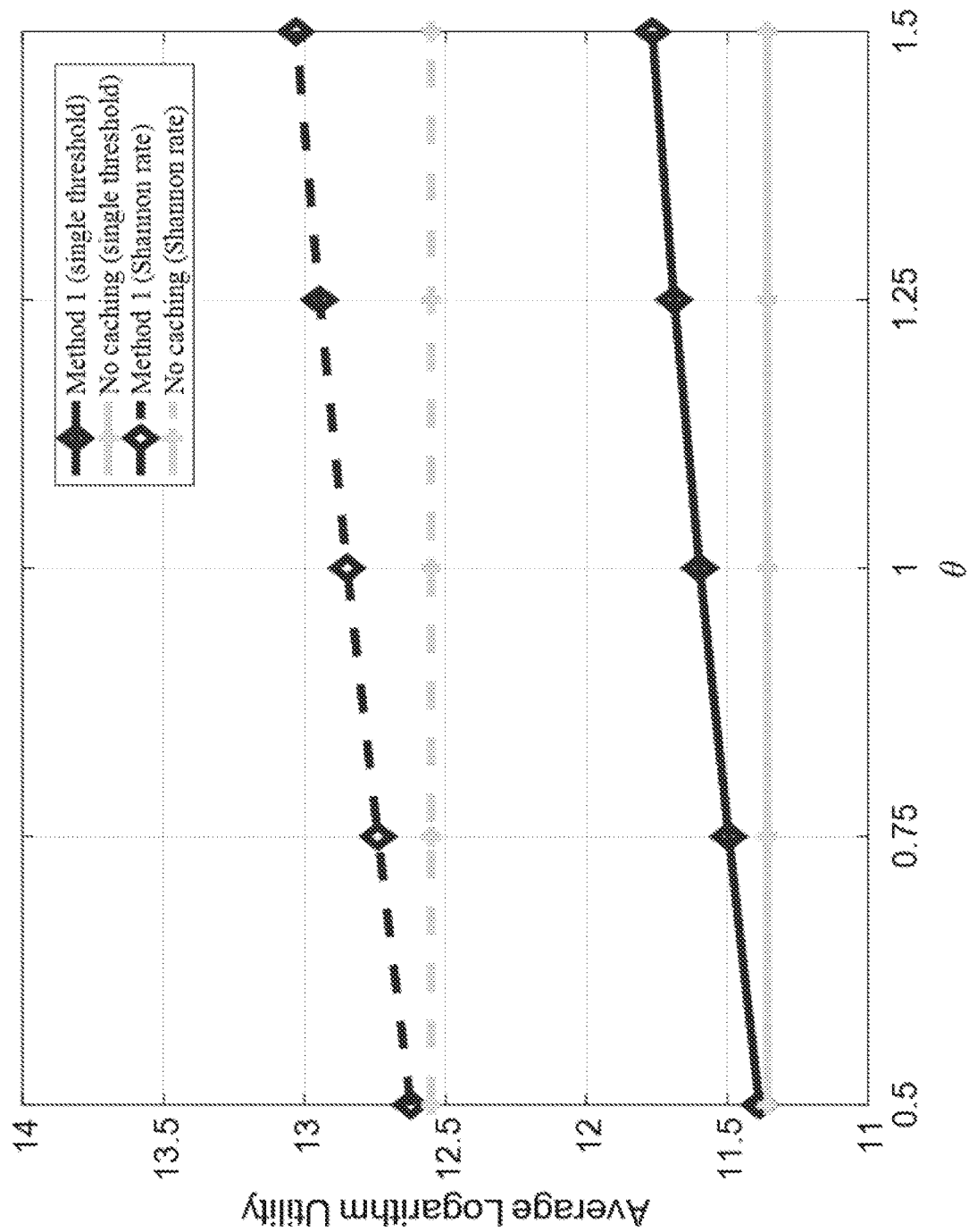
FIG. 13 is graph of an average logarithm utility versus the exponent of Zipf's distribution in accordance with the principles of the disclosure.

In FIG. 13 (which illustrates an average logarithm utility versus the exponent Zipf's distribution), the exponent of Zipf's distribution $\theta$ is changed, thus changing the file requesting probabilities $\{q_i\}$. In both the single-threshold model and Shannon rate model, Method 1 outperforms the no caching scheme.

Method 2: Optimal Joint Spectrum Allocation and Cache Placement

First, the closed form solution of spectrum allocation under any fixed file caching probabilities is derived. For any fixed random caching probabilities, $\{p_\mathcal{F}\}$, optimization problem $\mathcal{P}$ is recast as $$\mathcal{P}_2 \max_{\{\eta_0, \eta_1\}} \left(1 - \rho_1 \sum_{i=1}^{N} q_i p_i\right) \log \eta_0 + \rho_1 \sum_{i=1}^{N} q_i p_i \log \eta_1$$

$$\text{s.t. } \eta_0 + \eta_1 \leq 1$$
$$\eta_1 \geq 0,$$
$$\eta_2 \geq 0.$$

Optimization problem $\mathcal{P}_2$ is convex. Using KKT conditions, the closed form solution is obtained.

Given $\{p_\mathcal{F}\}$, the optimal $\{\eta_0, \eta_1\}$ to problem $\mathcal{P}_2$ is $$\eta_0^* 1 - \rho_1 \sum_{i=1}^{N} q_i p_i,$$

$$\eta_1^* = \rho_1 \sum_{i=1}^{N} q_i p_i.$$

Further, $\{\eta_0^*, \eta_1^*\}$ is substituted into problem $\mathcal{P}$, and the objective is simplified as $$U' = \log[\log(1+T)] - \log\left(\frac{\mu}{\lambda_0}\right) - \frac{2T}{\gamma-2} + \rho_1 \left(\sum_{i=1}^{N} q_i p_i\right) \log\left(\sum_{i=1}^{N} q_i p_i\right) +$$

$$\sum_{i=1}^{N} \left(\frac{4T}{\gamma-2} \rho_0 \rho_1 + \rho_1 \log\left(\frac{\lambda_1}{\lambda_0}\right)\right) q_i p_i - \rho_1 \sum_{i=1}^{N} q_i \sum_{\mathcal{F} \in \mathbb{F}_i^K} p_\mathcal{F} \log(q_\mathcal{F}).$$

And U' in the above equation is convex with respect to $\{p_\mathcal{F}\}$.

Then based on this property, the optimal solution is derived as follows.

Case 1: If $\dfrac{4T\lambda_0 P_0^{\frac{2}{\gamma}}}{(\gamma-2)\left(\lambda_1 P_1^{\frac{2}{\gamma}} + \lambda_0 P_0^{\frac{2}{\gamma}}\right)} + \log\left(\dfrac{\lambda_1}{\lambda_0}\right) \leq,$ (1)

the optimal soluation is $\begin{cases} p_\emptyset^* = 1, \\ p_\mathcal{F}^* = 0, \mathcal{F} \in \mathbb{F}^K \setminus \{\emptyset\} \\ \eta_0^* = 1 \\ \eta_1^* = 0 \end{cases}$ Case 2: If $\dfrac{4T\lambda_0 P_0^{\frac{2}{\gamma}}}{(\gamma-2)\left(\lambda_1 P_1^{\frac{2}{\gamma}} + \lambda_0 P_0^{\frac{2}{\gamma}}\right)} + \log\left(\dfrac{\lambda_1}{\lambda_0}\right) > 0,$ the optimal soluation is $\begin{cases} p_{\{1,\ldots,K\}}^* = 1, \\ p_\mathcal{F}^* = 0, \mathcal{F} \in \mathbb{F}^K \setminus \{\{1, \ldots, K\}\} \\ \eta_0^* = 1 - \rho_1 \sum_{i=1}^{K} q_i \\ \eta_1^* = \rho_1 \sum_{i=1}^{K} q_i \end{cases}$ where the $$\frac{4T\lambda_0 P_0^{\frac{2}{\gamma}}}{(\gamma-2)\left(\lambda_1 P_1^{\frac{2}{\gamma}} + \lambda_0 P_0^{\frac{2}{\gamma}}\right)} + \log\left(\frac{\lambda_1}{\lambda_0}\right)$$

is a caching metric.

Method to Jointly Randomly Cache in DTxs and Allocate Spectrum Between Cellular and D2D Communication The details of Method 2 are as follows:

Each DTx collects the spatial statistics of the network including the density of the network node 16, DTx, and DRx, and the requesting probability of the popular files in the network.

Each DTx computes the term $$\frac{4T\lambda_0 P_0^{\frac{2}{\gamma}}}{(\gamma-2)\left(\lambda_1 P_1^{\frac{2}{\gamma}} + \lambda_0 P_0^{\frac{2}{\gamma}}\right)} + \log\left(\frac{\lambda_1}{\lambda_0}\right).$$

If $$\frac{4T\lambda_0 P_0^{\frac{2}{\gamma}}}{(\gamma-2)\left(\lambda_1 P_1^{\frac{2}{\gamma}} + \lambda_0 P_0^{\frac{2}{\gamma}}\right)} + \log\left(\frac{\lambda_1}{\lambda_0}\right)$$

is positive, then each DTx caches the top K popular files, where K is the maximum number of files that a DTx can cache, and the network controller allocates spectrum to cellular and D2D communication according to equation (1).

$$\frac{4T\lambda_0 P_0^{\frac{2}{\gamma}}}{(\gamma-2)\left(\lambda_1 P_1^{\frac{2}{\gamma}} + \lambda_0 P_0^{\frac{2}{\gamma}}\right)} + \log\left(\frac{\lambda_1}{\lambda_0}\right)$$

then the network controller allocates the entire spectrum to cellular, and DTx does not cache any files.

In one or more embodiments, the network node 16 receives an indication as to whether DTx determined to cache files such that network node 16 may allocate spectrum based at least in part on this determination.

Numerical Simulation

The performance of the following is evaluated: Method 2, the equal spectrum allocation scheme, the equal caching probability scheme, and the no caching scheme. In Method 2, the spectrum allocation and cache placement are jointly optimized. In the equal spectrum allocation scheme, the spectrum is divided into two equal sub-spectrums for D2D and cellular communication, and the caching strategy is the optimal caching strategy under fixed spectrum. In the equal caching probability scheme, each DTx caches the files based on equal probability, and the spectrum allocation is optimal based on the fixed caching probability. In the no caching scheme, all DRxs download their requested file from a network node 16. The default system simulation parameters are in Table 2. The simulation results are averaged over 1000 PPP realizations. Although the single-threshold rate model is used in the analysis, the performance under a Shannon rate model is further investigated, where the rate is computed as log (1+SIR).

TABLE 2

| Default Simulation Parameters | |
|---|---|
| Transmission power of network node 16 | 40 W |
| Transmission power of DTx | 0.25 W |
| Density of network node 16 | $\frac{1}{2500 \text{ m}^2}$ |
| Density of DTx | $\frac{5}{2500 \text{ m}^2}$ |
| Pathloss exponent | 4 |
| Bandwidth | 20 MHz |
| Number of popular files | 10 |
| SIR threshold | 1 |
| Maximum number of cached files in a DTx | 3 |
| File requesting probability model | Zip's distribution, $q_i = \frac{i^{\theta}}{\sum_{j=1}^{N} j^{\theta}}$ |
| Exponent of Zip's distribution $\theta$ | 1 |

Figure 14:
FIG. 14 is a graph of wireless device's 5th, 50th and 90th percentile data rate in single threshold model in accordance with the principles of the disclosure.
Figure 15:
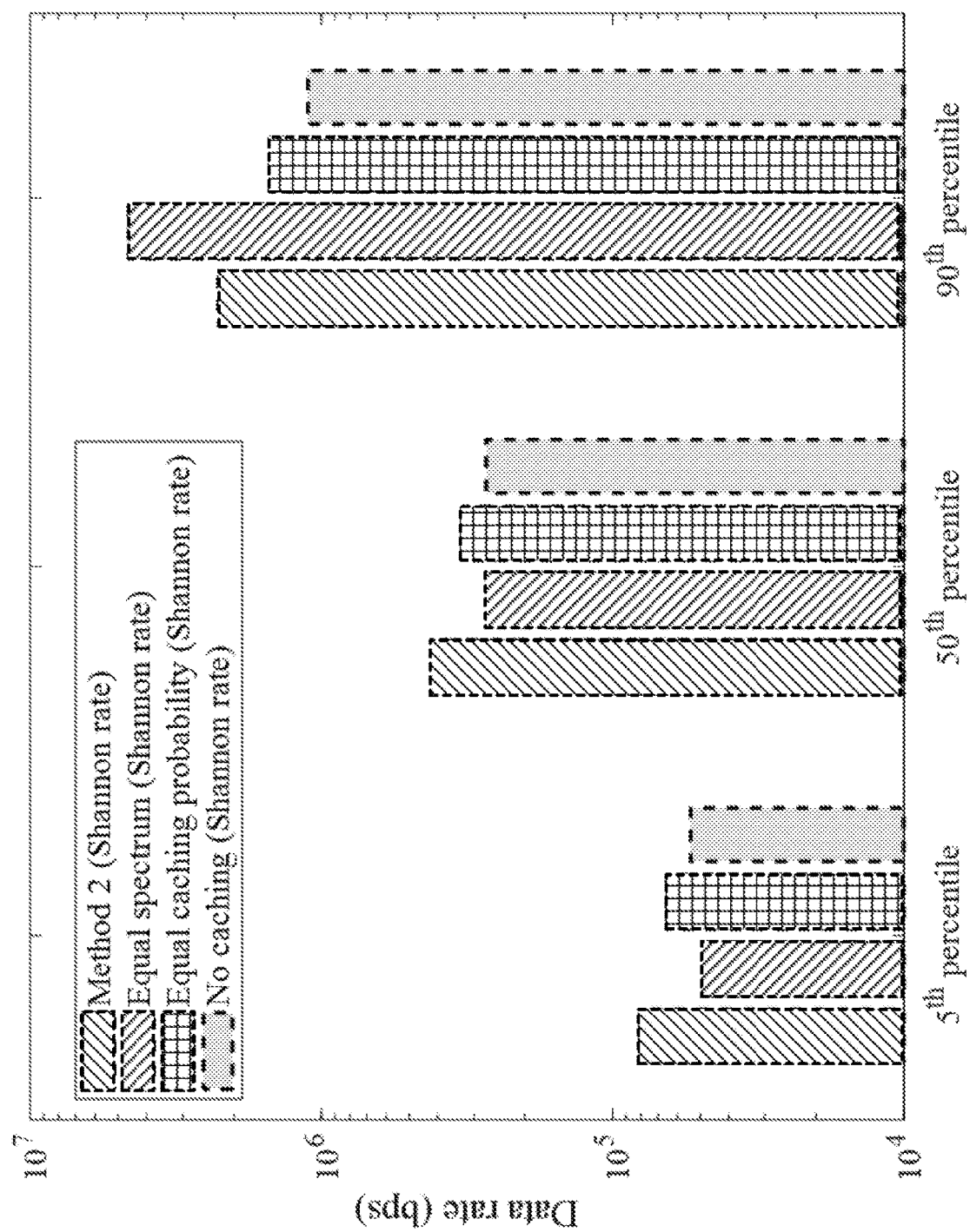
FIG. 15 is a graph of requesting wireless device's 5th, 50th and 90th percentile data rate in Shannon rate model in accordance with the principles of the disclosure.

In FIG. 14 (which illustrates DRx's 5th, 50th and 90th percentile data rate in the single threshold model) and FIG. 15 (which illustrates DRx's 5th, 50th and 90th percentile data rate in the Shannon rate model), the DRx's 5th, 50th and 90th percentile data rates of different schemes are shown. The 5th percentile and 50th percentile data rates represent the cell edge data rate and medium data rate, respectively. The 5th and 50th percentile data rates in Method 2 are larger than those of other three schemes in both the single-threshold rate model and the Shannon rate model. The 90th percentile data rates in Method 2 are larger than those of the equal probability scheme and no caching scheme, but less than those of the equal spectrum scheme. This shows that Method 2 benefits the DRxs with bad channel conditions by decreasing the rate allocated to DRxs with good channel condition.

Figure 16:
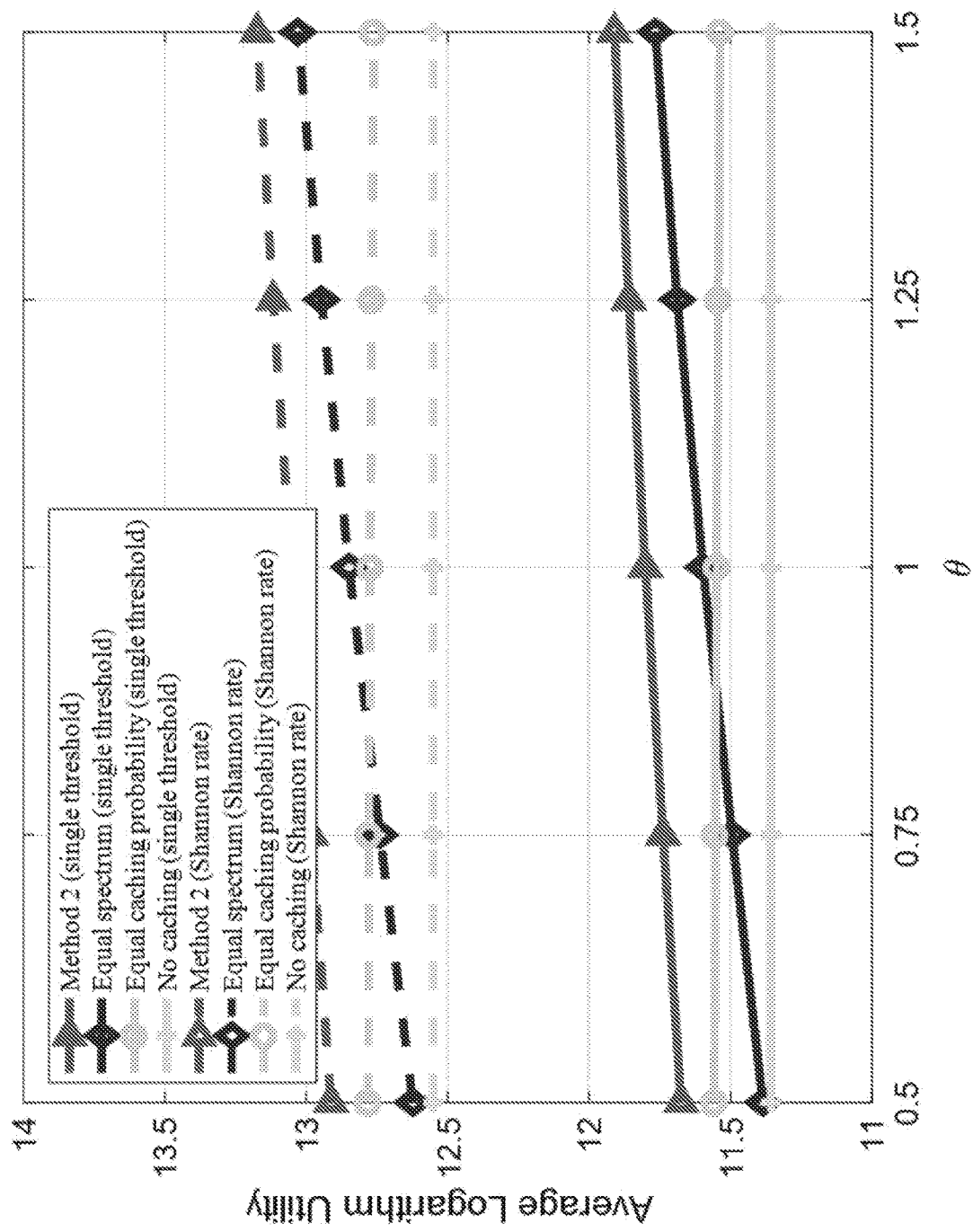
FIG. 16 is a graph of an average logarithm utility versus the exponent of Zipf's distribution in accordance with the principles of the disclosure.
Figure 17:
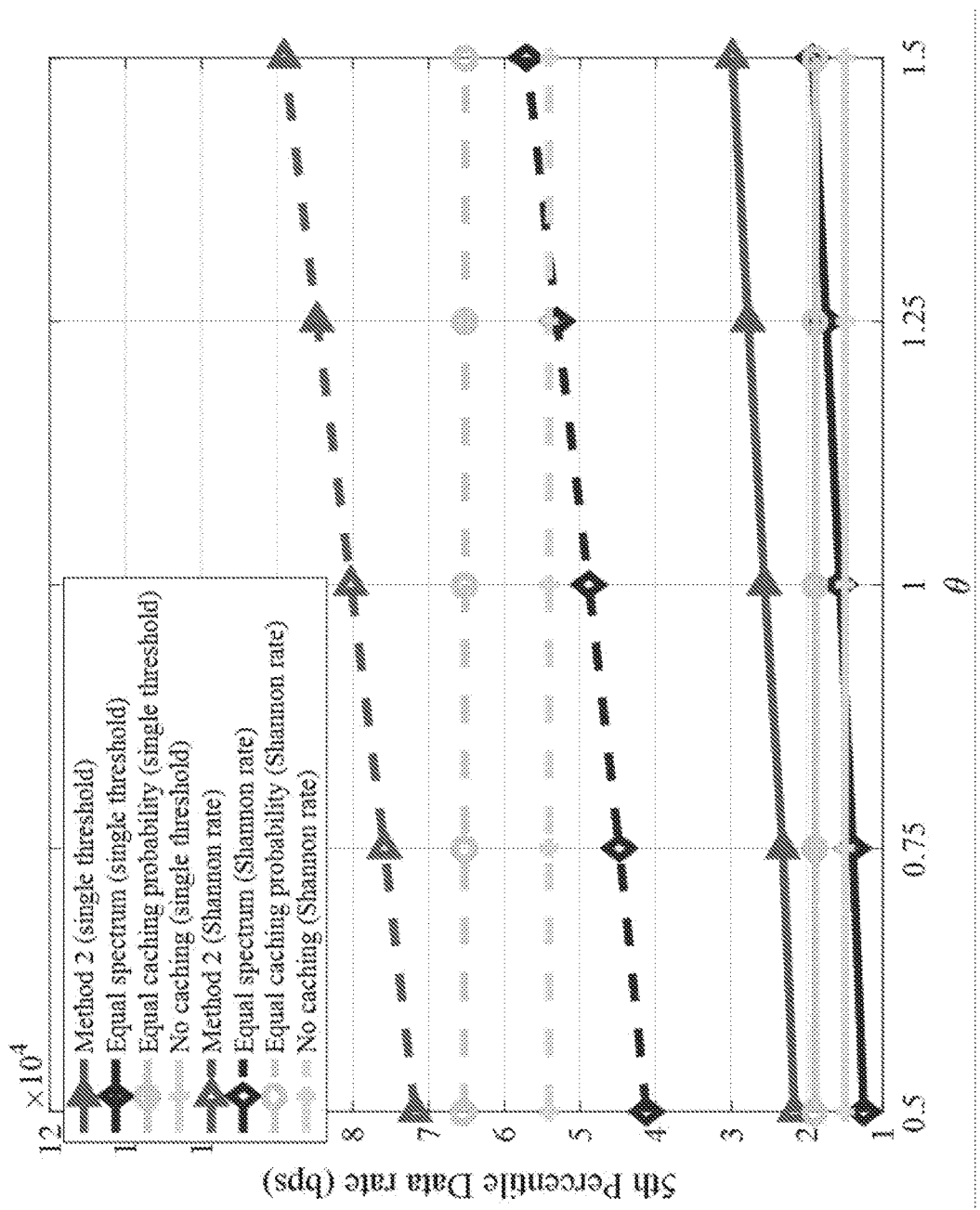
FIG. 17 is a graph of cell edge data rate versus the exponent of Zipf's distribution in accordance with the principles of the disclosure.

FIG. 16 (which illustrates an average logarithm utility versus the exponent Zipf s distribution) shows the average logarithm utility versus the exponent of Zipfs distribution $\theta$. Method 2 outperforms the other three schemes. The average logarithm utility of Method 2 and equal spectrum allocation scheme increases with respect to $\theta$. The average logarithm utility in the equal probability scheme is insensitive to the change of $\theta$. When $\theta=0.5$ and $\theta=0.75$, the average logarithm utility of the equal spectrum allocation scheme is less than that of the equal probability scheme. FIG. 17 (which illustrates a cell edge data rate versus the exponent of Zipf s distribution) shows the cell edge data rate of different schemes with different $\theta$ settings. The cell edge data rate of the proposed scheme is larger than that of the other three schemes. Furthermore, the cell edge data rate of the equal caching probability scheme is larger than that of the equal spectrum allocation scheme except when $\theta=1.5$ in single threshold model. When $\theta=0.75$, the cell edge data rate of the equal spectrum allocation scheme is less than that of the no-caching scheme in the single threshold rate model. When $\theta \leq 1.25$, the cell edge data rate of the equal spectrum allocation scheme is less than that of the no-caching scheme in the Shannon rate model.

Therefore, the disclosure provides at least several advantages. For example, the methods described herein, i.e., Method 1 and Method 2, do not require exact network topology information or CSI, which can significantly reduce the amount of signalling overhead such as compared to existing systems/methods. Further, the methods described herein, i.e., Method 1 and Method 2, are computationally efficient such as compared to existing system/methods. Method 1 may only need to solve a convex optimization problem to compute the optimal file caching probabilities. Method 2 gives a closed-form formula to compute the optimal spectrum allocation and cache placement.

Some Examples

Example A1. A network node 16 configured to communicate with a wireless device 22, WD 22, the network node 16 configured to, and/or comprising a radio interface and/or comprising processing circuitry 68 configured to:
receive an indication whether the WD 22 is to cache at least one file based on spatial statistics of a cache-enabled device-to-device, D2D, network collected by the WD 22; and
perform spectrum allocation based on the received indication.

Example A2. The network node 16 of Example A1, wherein the indication includes an indication of a caching metric;
if the caching metric is a positive value, allocating spectrum to cellular communications and D2D communications based on at least one of the plurality of probabilities for caching the plurality of files; and
if the caching metric is a non-positive value, allocating the spectrum to cellular communications without allocating spectrum to D2D communications.

Example A3. The network node 16 of Example A1, wherein the spatial statistics include a density of the network and allocated spectrum.

Example B1. A method implemented in a network node 16, the method comprising:
receiving an indication whether a wireless device 22, WD 22, is to cache at least one file based on spatial statistics of a cache-enabled device-to-device, D2D, network collected by the WD 22; and
performing spectrum allocation based on the received indication.

Example B2. The method of Example B1, wherein the indication includes an indication of a caching metric;
if the caching metric is a positive value, allocating spectrum to cellular communications and D2D communications based on at least one of the plurality of probabilities for caching the plurality of files; and
if the caching metric is a non-positive value, allocating the spectrum to cellular communications without allocating spectrum to D2D communications.

Example B3. The method of Example B1, wherein the spatial statistics include a density of the network and allocated spectrum.

Example C1. A wireless device 22, WD 22, configured to communicate with a network node 16, the WD 22 configured to, and/or comprising a radio interface 82 and/or processing circuitry 84 configured to:
collect spatial statistics of a cache-enabled device-to-device, D2D, network; determine whether to cache at least one file based on the collected spatial statistics; and
receive a spectrum allocation.

Example C2. The WD 22 of Example C1, wherein the determining whether to cache at least one file based on the collected statistics includes determining a plurality of probabilities for caching a plurality of files, each probability of the plurality of probabilities corresponding to a respective file of the plurality of files; and
the at least one file to be cached is cached based on the plurality of probabilities for caching the plurality of files.

Example C3. The WD 22 of Example C1, wherein the determining whether to cache at least one file based on the collected statistics includes:
determining a caching metric;
if the caching metric is a positive value, caching a subset of a plurality of files having the greatest number of requests from among the plurality of files; and
if the caching metric is a non-positive value, caching none of the plurality of files.

Example C4. The WD 22 of Example C1, wherein the spectrum allocation is one of predefined and based on a value of a caching metric.

Example D1. A method implemented in a wireless device 22, WD 22, the method comprising:
collecting spatial statistics of a cache-enabled device-to-device, D2D, network;
determining whether to cache at least one file based on the collected spatial statistics; and
receiving a spectrum allocation.

Example D2. The method of Example D1, wherein the determining whether to cache at least one file based on the collected statistics includes determining a plurality of probabilities for caching a plurality of files, each probability of the plurality of probabilities corresponding to a respective file of the plurality of files; and
the at least one file to be cached is cached based on the plurality of probabilities for caching the plurality of files.

Example D3. The method of Example D1, wherein the determining whether to cache at least one file based on the collected statistics includes:
determining a caching metric;
if the caching metric is a positive value, caching a subset of a plurality of files having the greatest number of requests from among the plurality of files; and
if the caching metric is a non-positive value, caching none of the plurality of files.

Example D4. The method of Example D1, wherein the spectrum allocation is one of predefined and based on a value of a caching metric.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
AP access point
DM discovery mode
D2D Device-to-device
DTx the transmitter in the D2D pair
DRx the receiver in the D2D pair
DMRS dedicated modulation reference signal
MCS modulation and coding scheme
RB resource block
BCD block coordinate descent
MM majorization minimization
SINR signal to interference plus noise ratio
SIR signal to interference ratio
Prob probability
CMAS Commercial Mobile Alert System
EWS Earthquake and Tsunami Warning System
GNSS Global Navigation Satellite System
GPS Global Positioning System
LTE Long Term Evolution
MME Mobility Management Entity
OFDM Orthogonal Frequency Division Multiplexing
PLMN Public Land Mobile Network (PLMN)
PRB Physical Resource Block
PWS Public Warning System
E-UTRAN Evolution UMTS Terrestrial Radio Access Network
MPR Maximum power reduction
A-MPR Additional MPR
WCDMA Wide band code division multiple access
OOB Out of band
RRH Remote Radio Head
RRU Remote Radio Unit
UE User equipment It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A first wireless device configured to communicate with a second wireless device, the first wireless device comprising processing circuitry configured to:
   determine to cache a first file of a plurality of files based at least in part on maximizing a mean log utility associated with the second wireless device,
   wherein the processing circuitry is further configured to receive a spectrum allocation based at least in part on the maximizing of the mean log utility, and
   wherein the caching the first file of the plurality of files and the spectrum allocation is based at least in part on a metric; and
   the wireless device determining to cache the first file of the plurality of files and receiving the spectrum allocation if the metric is a positive value; and
   the wireless device determining not to cache the first file of the plurality of files and not receiving the spectrum allocation if the metric is a non-positive value.

2. The first wireless device of claim 1, wherein the mean log utility is based at least in part on:
 a probability of the second wireless device associating with the first wireless device to request the first file from the first wireless device; and
 a probability of the second wireless device associating with a network node to request the first file from the network node.

3. The first wireless device of claim 1, wherein the mean log utility associated with the second wireless device is based at least in part on:
 a first mean log utility of the second wireless device associating with the first wireless device; and
 a second mean log utility of the second wireless device associating with a network node.

4. The first wireless device of claim 1, wherein the processing circuitry is further configured to determine caching probabilities for the plurality of files, each caching probability corresponding to a probability of a file being requested by the second wireless device.

5. The first wireless device of claim 1, wherein the determination to cache the first file of the plurality of files is based at least in part on spatial statistics of a network.

6. The first wireless device of claim 5, wherein the spatial statistics include at least one of a density of the network and allocated spectrum.

7. The first wireless device of claim 5, wherein the spatial statistics include a requesting probability of the first file and respective densities of a network node, the first wireless device and second wireless device.

8. The first wireless device of claim 1, wherein the first file that is determined to be cached has a lower probability of being requested than at least one other file of the plurality of files that is not cached.

9. A method implemented by a first wireless device configured to communicate with a second wireless device, the method comprising:
 determining to cache a first file of a plurality of files based at least in part on maximizing a mean log utility associated with the second wireless device; and
 receiving a spectrum allocation based at least in part on the maximizing of the mean log utility,
 wherein the caching of the first file of the plurality of files and the spectrum allocation is based at least in part on a metric;
 the wireless device determining to cache the first file of the plurality of files and receiving the spectrum allocation if the metric is a positive value; and
 the wireless device determining not to cache the first file of the plurality of files and not receiving the spectrum allocation if the metric is a non-positive value.

10. The method of claim 9, wherein the mean log utility is based at least in part on:
 a probability of the second wireless device associating with the first wireless device to request the first file from the first wireless device; and
 a probability of the second wireless device associating with a network node to request the first file from the network node.

11. The method of claim 9, wherein the mean log utility associated with the second wireless device is based at least in part on:
 a first mean log utility of the second wireless device associating with the first wireless device; and
 a second mean log utility of the second wireless device associating with a network node.

12. The method of claim 9, further comprising determining caching probabilities for the plurality of files, each caching probability corresponding to a probability of a file being requested by the second wireless device.

13. The method of claim 9, wherein the determination to cache the first file of the plurality of files is based at least in part on spatial statistics of a network.

14. The method of claim 13, wherein the spatial statistics include at least one of a density of the network and allocated spectrum.

15. The method of claim 13, wherein the spatial statistics include a requesting probability of the first file and respective densities of a network node, the first wireless device and second wireless device.

16. The method of claim 9, wherein the first file that is determined to be cached has a lower probability of being requested than at least one other file of the plurality of files that is not cached.

17. A network node configured to communicate with a first wireless device, the network node comprising processing circuitry configured to:
 receive an indication whether the first wireless device is to cache a first file of a plurality of files based at least in part on maximizing a mean log utility associated with a second wireless device; and
 perform spectrum allocation based at least in part on the received indication,
 wherein the indication includes an indication of a caching metric; and
 if the caching metric is a non-positive value, the spectrum is allocated to cellular communications without allocating spectrum for device-to-device communications between the first and second wireless devices.

18. The network node of claim 17, wherein the indication includes an indication of a caching metric; and
 if the caching metric is a positive value, the spectrum is allocated to cellular communications and device-to-device communications between the first and second wireless devices.

19. The network node of claim 17, wherein the indication is based at least in part on spatial statistics associated with of a network.

20. The network node of claim 19, wherein the spatial statistics include at least one of:
 a density of the network;
 a density of the allocated spectrum; and
 a requesting probability of the first file.

21. A method implemented in a network node configured to communicate with a first wireless device, the method comprising:
 receiving an indication whether the first wireless device is to cache a first file of a plurality of files based at least in part on maximizing a mean log utility associated with a second wireless device; and
 performing spectrum allocation based at least in part on the received indication,
 wherein the indication includes an indication of a caching metric; and
 if the caching metric is a non-positive value, the spectrum is allocated to cellular communications without allocating spectrum for device-to-device communications between the first and second wireless devices.

22. The method of claim 21, wherein the indication includes an indication of a caching metric; and
> if the caching metric is a positive value, the spectrum is allocated to cellular communications and device-to-device communications between the first and second wireless devices.

23. The method of claim 21, wherein the indication is based at least in part on spatial statistics associated with of a network.

24. The method of claim 23, wherein the spatial statistics include at least one of:
> a density of the network;
> a density of the allocated spectrum; and
> a requesting probability of the first file.

* * * * *